United States Patent
Osuala et al.

(10) Patent No.: US 11,748,384 B2
(45) Date of Patent: Sep. 5, 2023

(54) DETERMINING AN ASSOCIATION RULE

(71) Applicant: International Business Machines Corporation, Armonk, NY (US)

(72) Inventors: Richard Obinna Osuala, Munich (DE); Michael Cherner, Mönchengladbach (DE); Michael Krißgau, Ansbach (DE)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 17/303,406

(22) Filed: May 28, 2021

(65) Prior Publication Data

US 2022/0382784 A1    Dec. 1, 2022

(51) Int. Cl.
*G06F 16/28* (2019.01)

(52) U.S. Cl.
CPC ................... *G06F 16/285* (2019.01)

(58) Field of Classification Search
CPC .................. G06F 16/285; G06F 2201/86
See application file for complete search history.

(56) References Cited

U.S. PATENT DOCUMENTS

| | | | |
|---|---|---|---|
| 5,615,341 A | | 3/1997 | Agrawal |
| 6,408,295 B1 | | 6/2002 | Aggarwal |
| 7,089,250 B2 | | 8/2006 | Doganata |
| 7,370,033 B1 | | 5/2008 | Roychowdhury |
| 2005/0283680 A1* | | 12/2005 | Kobayashi .......... G06F 11/3636 |
| | | | 714/39 |
| 2007/0289013 A1 | | 12/2007 | Lim |
| 2010/0332430 A1 | | 12/2010 | Caraviello |
| 2017/0134240 A1* | | 5/2017 | Hévizi .................. H04L 41/069 |
| 2017/0302685 A1* | | 10/2017 | Ladnai .................. H04L 63/145 |
| 2018/0165173 A1* | | 6/2018 | Lin ........................ G06F 16/285 |

(Continued)

FOREIGN PATENT DOCUMENTS

| | | |
|---|---|---|
| CN | 103353880 A | 10/2013 |
| CN | 107491499 B | 9/2018 |
| CN | 109299282 A | 2/2019 |

OTHER PUBLICATIONS

Hájek, P., Havel, I. & Chytil, M. The GUHA method of automatic hypotheses determination. Computing 1, 293-308 (1966). https://doi.org/10.1007/BF02345483.

(Continued)

*Primary Examiner* — Grace Park
(74) *Attorney, Agent, or Firm* — Grant Johnson

(57) ABSTRACT

A method and related system, comprising receiving a dataset comprising records, where each record of the records comprises information descriptive of an event corresponding to an entity. The records may be clustered resulting in clusters having categories respectively, each cluster category being indicative of an event category of the events. One or more event attributes descriptive of the events may be determined. Records having values of the determined event attributes may be selected from the dataset. The selected records may be grouped according to a grouping criterion, the grouping criterion being based on the values of the determined event attributes. At least one association rule may be determined using the groups and the cluster identifiers, where each association rule indicates a relationship between the event categories of a respective group.

18 Claims, 12 Drawing Sheets

(56) References Cited

U.S. PATENT DOCUMENTS

| | | | |
|---|---|---|---|
| 2018/0270261 A1* | 9/2018 | Pande | G06N 20/00 |
| 2021/0149384 A1* | 5/2021 | Dittmer | H04L 43/16 |

OTHER PUBLICATIONS

Rakesh Agrawal et al, "Mining association rules between sets of items in large databases," ACM SIGMOD RecordJun. 1993 https://doi.org/10.1145/170036.170072.

B. Song, Y. Feng, X. Li, Z. Sun and Y. Yang, "Un-apriori: A novel association rule mining algorithm for unstructured EMRs," 2017 IEEE 19th International Conference on e-Health Networking, Applications and Services (Healthcom), Dalian, China, 2017, pp. 1-6, doi: 10.1109/HealthCom.2017.8210792.

Daniel Cer, Yinfei Yang, Sheng-yi Kong, Nan Hua, Nicole Limtiaco, Rhomni St. John, Noah Constant, Mario Guajardo-Cespedes, Steve Yuan, Chris Tar, Yun-Hsuan Sung, Brian Strope, Ray Kurzweil: "Universal Sentence Encoder," Apr. 12, 2018, arXiv:1803.11175.

Disclosed Anonymously, "Using Unstructured Data for Identifying Trends to Provide Predictive Insights," IP.com Electronic Publication Date: Sep. 22, 2015, https://priorart.ip.com/IPCOM/000243447.

Febin Issac, Yeshwant More "Associative Rule Mining in Large Datasets using Neural Network Algorithm and enhanced Apriori-Based algorithm". International Journal of Computer Trends and Technology (IJCTT) V59(1):30-34, May 2018. ISSN:2231-2803. www.ijcttjournal.org. Published by Seventh Sense Research Group.

François Chollet, "Xception: Deep Learning with Depthwise Separable Convolutions," arXiv:1610.02357.

Jacob Devlin, Ming-Wei Chang, Kenton Lee, Kristina Toutanova: "BERT: Pre-training of Deep Bidirectional Transformers for Language Understanding," May 24, 2019, arXiv:1810.04805.

Liu Tiecheng, "Optimizing mining association rules based on Artificial Neural Network," World Automation Congress 2012, Puerto Vallarta, Mexico, 2012, pp. 1-4, https://ieeexplore.ieee.org/document/6321648.

Mahgoub, Hany & Rösner, Dietmar & Ismail, Nabil & Torkey, Fawzy. (2007). A Text Mining Technique Using Association Rules Extraction. 4. http://citeseerx.ist.psu.edu/viewdoc/download?doi=10.1.1.212.8624&rep=rep1&type=pdf.

Mahgoub, Hany. "Mining Association Rules from Unstructured Documents." (2008), https://www.semanticscholar.org/paper/Mining-Association-Rules-from-Unstructured-Mahgoub/83b4093f8b8482457e74e64ac15fb138814afaa1?p2df.

Mansha S., Babar Z., Kamiran F., Karim A. (2016) Neural Network Based Association Rule Mining from Uncertain Data. In: Hirose A., Ozawa S., Doya K., Ikeda K., Lee M., Liu D. (eds) Neural Information Processing. ICONIP 2016. Lecture Notes in Computer Science, vol. 9950. Springer, Cham. https://doi.org/10.1007/978-3-319-46681-1_16.

Mathieu Guillame-Bert and James L. Crowley, "Learning Temporal Association Rules on Symbolic Time Sequences," JMLR: Workshop and Conference Proceedings 25: 159-174, 2012, http://proceedings.mlr.press/v25/guillame-bert12/guillame-bert12.pdf.

Ms. Aruna J. Chamatkar and Dr. P.K. Butey, "A Study on Association Rule Mining with Neural Based Framework," International Journal of Computer Engineering & Technology (IJCET), ISSN 0976-6375(Online) vol. 5, Issue 11, Nov. 2014, pp. 74-83.

Nazli Mohd Khairudin, Aida Mustapha, and Mohd Hanif Ahmad, "Effect of Temporal Relationships in Associative Rule Mining for Web Log Data," Hindawi Publishing Corporation, The Scientific World Journal, vol. 2014, Article ID 813983, 10 pages http://dx.doi.org/10.1155/2014/813983.

P. Sermswatsri & C. Srisa-an, "A neural-networks associative classification method for association rule mining," Data Mining VII: Data, Text and Web Mining and their Business Applications, pp. 93-102, https://www.witpress.com/Secure/elibrary/papers/DATA06/DATA06010FU1.pdf.

Qin, Liangxi and Zhongzhi Shi. "Efficiently Mining Association Rules from Time Series." (2006). https://www.semanticscholar.org/paper/Efficiently-Mining-Association-Rules-from-Time-Qin-Shi/4fec01de28a635ac0bb440b31545203f93483e78.

Qing Yang, Shao-Yu Wang, Ting-Ting Zhang, "Pruning and Summarizing the Discovered Time Series Association Rules from Mechanical Sensor Data," Sep. 2017, Proceedings of the 3rd Annual International Conference on Electronics, Electrical Engineering and Information Science (EEEIS 2017), https://doi.org/10.2991/eeeis-17.2017.7How to use a DOI?

Simonyan, K., & Zisserman, A. (2014). Very deep convolutional networks for large-scale image recognition. arXiv preprint arXiv:1409.1556.

Soni, Sunita & Vyas, O . . . (2010). Using Associative Classifiers for Predictive Analysis in Health Care Data Mining. International Journal of Computer Applications. 4. 10.5120/821-1163.

Wen Zhang, Bibek Paudel, Liang Wang, Jiaoyan Chen, Hai Zhu, Wei Zhang, Abraham Bernstein, Huajun Chen, "Iteratively Learning Embeddings and Rules for Knowledge Graph Reasoning," 2019, http://arxiv.org/abs/1903.08948.

Vaswani et al., "Attention Is All You Need", 31st Conference on Neural Information Processing Systems (NIPS 2017), Long Beach, CA, USA, 11 pages.

* cited by examiner

DETERMINING AN ASSOCIATION RULE

BACKGROUND

The present disclosure relates to the field of digital computer systems, and more specifically, to a method for determining an association rule.

Association rules may be used in machine learning and data science to identify significant relationships between variables in large data sets. For example, association rules, trained on point-of-sale transaction data, may be used to develop a deep understanding of relationships between products and product categories. With this deepened understanding, retailers can generate more accurate sales forecasts and/or can strategically optimize their product portfolio to target co-occurring product families.

SUMMARY

Various embodiments provide a method for determining an association rule, computer system and computer program product as described by the subject matter of the independent claims. Advantageous embodiments are described in the dependent claims. Embodiments of the disclosure can be freely combined with each other if they are not mutually exclusive.

In one aspect, the disclosure relates to a computer-implemented method comprising receiving a dataset comprising records, where each record of the records comprises information descriptive of an event corresponding to an entity, and clustering the records, resulting in clusters having categories respectively, each cluster category being indicative of an event category of the events, where each record of the records is associated with a cluster identifier indicating the cluster to which the record belongs. The computer-implemented method may further comprise determining one or more event attributes descriptive of the events, selecting from the dataset records having values of the determined event attributes, and grouping the selected records according to a grouping criterion, the grouping criterion being based on the values of the determined event attributes, the grouping resulting in groups, where each group comprises a set of records representing respective ones of the event categories. The computer-implemented method may further comprise determining at least one association rule using the groups and the cluster identifiers, where each association rule indicates a relationship between the event categories of a respective group.

In another aspect, the disclosure relates to a computer program product comprising a computer-readable storage medium having computer-readable program code embodied therewith, the computer-readable program code configured to implement all of the operations of the method according to preceding embodiments.

In another aspect, the disclosure relates to a computer system configured for receiving a dataset comprising records, where each record of the records comprises information descriptive of an event corresponding to an entity, and clustering the records, resulting in clusters having categories respectively, each cluster category being indicative of an event category of the events, wherein each record of the records is associated with a cluster identifier indicating the cluster to which the record belongs. The computer system may be further configured for determining one or more event attributes descriptive of the events, selecting from the dataset records having values of the determined event attributes, and grouping the selected records according to a grouping criterion, the grouping criterion being based on the values of the determined event attributes, the grouping resulting in groups, wherein each group comprises a set of records representing respective ones of the event categories. The computer system may be further configured for determining at least one association rule using the groups and the cluster identifiers, wherein each association rule indicates a relationship between the event categories of a respective group.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
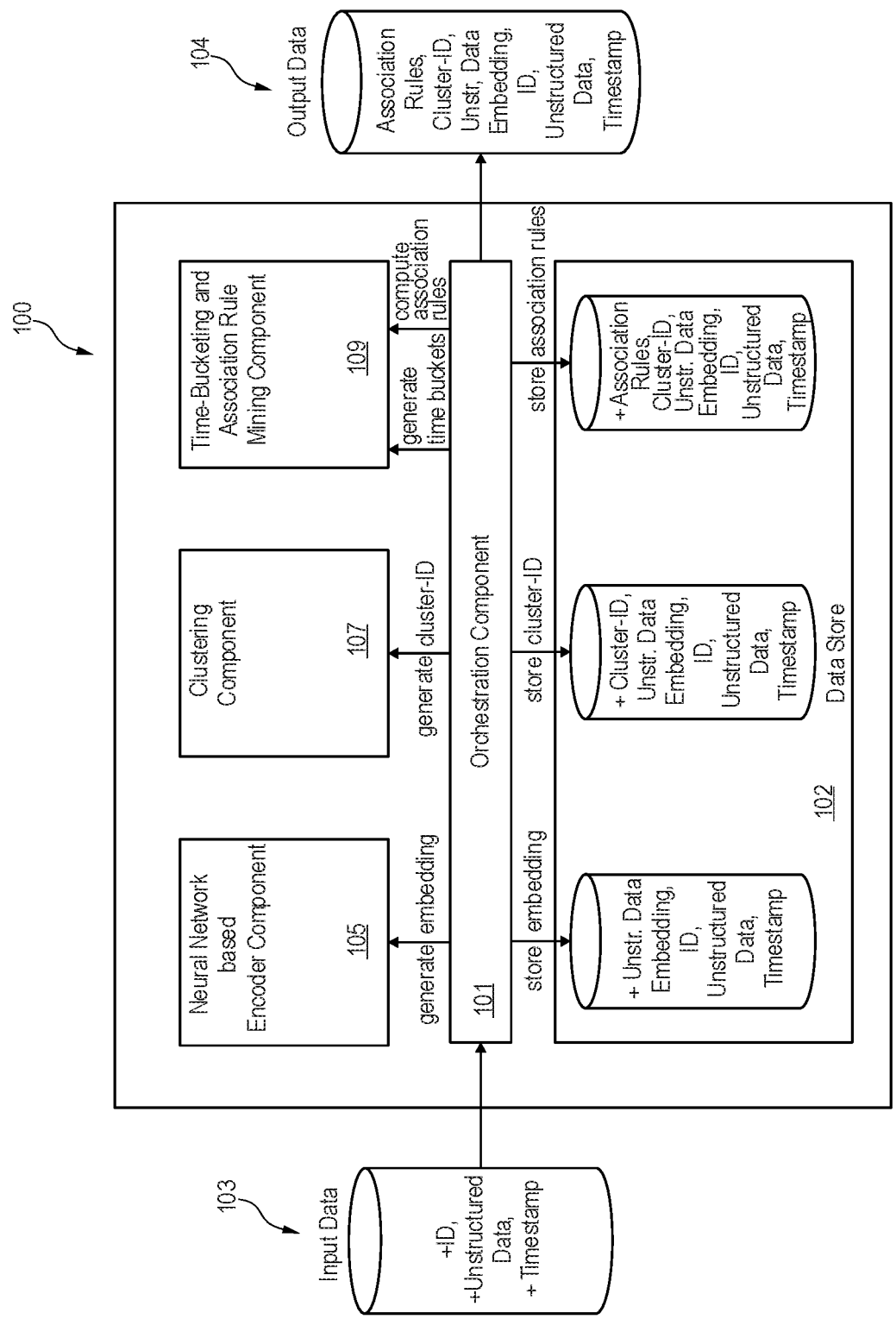
FIG. 1 is a block diagram of a computing system in accordance with some embodiments.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

The descriptions of the various embodiments of the disclosure will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

An association rule may refer to one or more relations between data items in a dataset. The association rule may be composed from two different sets of items, such as an antecedent set and a consequence set, where each of the sets may comprise one or more items. The consequent set may represent a negative result or a positive result depending on the domain of data from which the association rule is generated. For example, an antecedent set may comprise symptoms detected in previous medical check-ups (e.g., chest pain, high blood pressure) and the consequence set may comprise a diagnosis result from a medical professional (e.g., heart disease) indicating a negative result. Similarly, an antecedent set may comprise transactions recorded at a point-of-sale terminal and the consequence set may comprise combinations of items that are frequently purchased together.

The dataset may also be associated with an entity such as a production system or an individual. The data items may represent events respectively. This may enable event-driven rules. The event may refer to a real-life event that can be detected and/or recorded (e.g., the control of the function X of a machine may be an event). The data item may comprise information (e.g., results of the control) concerning an event that has occurred. The events may belong to event categories. The event category refers to a type of events (e.g., controlling the function X of the machine may be one event type, while the occurrence of an incident of type Y in the machine may be another event type). Multiple data items may represent different events that belong to the same event category (e.g., data items may comprise results of several controls of the function X). The information concerning an event may comprise information regarding the details of occurrence of the event (e.g., the results of the control). The information concerning the event may further comprise values of event attributes that describe, for example, the time at which the event occurred, the location in which the event occurred etc. The data item may be represented in the dataset by a structured and/or unstructured data record. The unstructured record may comprise values of attributes in an unstructured form. The unstructured record may enable to associate attributes to corresponding attribute values. The unstructured record may be a file, document or an object with free form text or embedded values included therein. Examples of unstructured records may include word processing documents (e.g., Microsoft Word documents in their native format), Adobe Acrobat documents, emails, image files, video files, audio files, and other files in their native formats relative to the software application that created them. The structured data record may be a collection of related data items such as a name, date of birth and class of a particular user. The structured data record may conform a data model, and may be stored in the form of rows and columns in a database.

An association rule analysis may be a technique to discover the association rules in a dataset. The association rule analysis may, for example be a fully automatic analysis or a semi-automatic analysis. Embodiments utilizing fully automatic association rule analysis may be advantageous as they may improve the processing of the datasets. For example, an association rule may be determined using a machine learning method. The semi-automatic association rule analysis may be advantageous as it may enable a controlled processing of the relation determination. For example, an association rule may be defined using a graphical user interface.

The association rules may be determined for different types of entities. However, different technical challenges may arise. First, the choice of the entities for which the association rules may be determined may be a challenging task because each entity may have its own data that need to be studied in detail before deciding to run an association rule analysis. This may, however, be a resource consuming task. Second, generating association rules from different types of datasets may be challenging, because there are many types of datasets and each type of datasets may have a different structure. Third, the association rules may need to be accurately determined; otherwise, technical decisions based on such rules may be erroneous. Some embodiments of the disclosure may solve these issues as it may organize data records of the dataset in a special form that may enable efficiently and accurately finding the association rules. This may be performed independent of the type of the entity and independent of the type of datasets being used. Another advantage of some embodiments is that the method may automatically be performed.

According to some embodiments, the determining of the at least one association rule by an association rule mining algorithm may comprise: identifying in the groups at least one pattern of a set of cluster identifiers. The pattern may be defined by at least two groups of the groups, where each group defining the pattern may comprise a set of records having said set of cluster identifiers, where the event categories between which the relationship is determined may be categories of the clusters having said set of cluster identifiers respectively, and for each pattern of the at least one pattern creating the determined association rule between the event categories of the pattern. The clustering may, for example, be performed based on similarity of the records.

For example, the groups may comprise N groups $GRP_1$, $GRP_2 \ldots GRP_N$. Each group $GRP_i$ of the groups may comprise a set of $n_i$ records $R_1^i, R_2^i \ldots R_{n_i}^i$. Creation of each record of the set of records may be triggered by a respective event of a set of $n_i$ events. The set of events may have $m_i$ distinct event categories, where $m_i \leq n_i$ (e.g., the first subset of the events for group $GRP_1$ may be the control of function X and the remaining subset of events may be the incident events of type Y, meaning that the set of $n_1$ records of group $GRP_1$ represent a set of two event categories). The pattern may be defined if, for example, two or more groups have the same set of event categories. Following the above example, if the group $GRP_3$ has the same set of event categories as $GRP_1$, then there is a pattern defined by $GRP_1$ and $GRP_3$ (although the number of records $n_1$ and $n_3$ may be different, the two groups may represent the same number of event categories). Using the patterns, the association rules may be determined or inferred. Following the above example, it may be determined that the occurrence of the event Y is caused by the occurrence of the event X, if the event Y always occurs after event X.

According to some embodiments, the relationship may be a causal relationship indicating that one event category of the set of event categories is caused by the other event categories of the set of event categories. The association rule mining algorithm may be a trained algorithm that is configured to receive event categories as input and to predict an event category of an event that is caused by other events having said input event categories, wherein the determining of the association rule may comprise for each group of the groups: (i) inputting event categories of the group into the trained algorithm and receiving a predicted event category; and (ii) determining the association rule as a causal relationship between the input event categories and the predicted event category in this case. The predicted event category is one of the event categories of the group that are not input to the trained algorithm and where a probability of the prediction is higher than a threshold value.

For example, for each group $GRP_i$ of the N groups, a subset of $k_i$ event categories of the set of $m_i$ event categories of the $GRP_i$ may be provided as input to the trained algorithm, where $k_i \leq m_i - 1$ and preferably $k_i = m_i - 1$. For example, the subset of $k_i$ event categories may be randomly selected from the set of $m_i$ event categories. This may enable a systematic and fast inference of the trained algorithm. In another example, the subset of $k_i$ event categories may be selected from the set of $m_i$ event categories based on a predefine selection criterion. The selection criterion may, for example, require that the $k_i$ event categories comprise at least two distinct event categories. This may enable a controlled inference of the trained algorithm and may thus increase the accuracy of the predictions of the trained algorithm. The trained algorithm may predict an event category. The predicted event category may be used for the association rule if the predicted event category is one of the $m_i - k_i$ remaining non-selected event categories of the group $GRP_i$ and if the probability of the prediction is higher than the threshold value. In this case for this example, the association rule may be a causal relationship between the subset of $k_i$ event categories and the predicted event category.

According to some embodiments, the method may further comprise: receiving a training set of training association rules, wherein each training association rule of the training set may be a causal relationship indicating that one training event category, named outcome event category, of a set of training event categories is caused by a subset of remaining training event categories, named subset of causing event categories, of the set of training event categories; generating a set of rows for the training association rules respectively, wherein each row comprises at least one first column and a second column, and wherein the at least one first column of the row contains the subset of causing event categories, and wherein the second column of the rows contains the outcome event category; training the association rule mining algorithm using the set of rows. The training may, for example, be performed with the at least one first column as an independent variable and the second column as a dependent variable respectively.

In an example, the at least one first column may comprise one column per event category of the subset of causing event categories. In an example, the training set may regularly be updated by the inference results of the trained algorithm. The updated training set may be used to regularly retrain the algorithm. This may increase the accuracy of the predictions over time.

According to some embodiments, the determined event attribute may comprise a time of the event, wherein the group associated with the set of event categories of each of the association rules comprises a sequence of records that are sequential in time, wherein the last record of the sequence has an event category that is caused by the event categories of the other earlier records of the sequence according to the association rule.

For example, each group $GRP_i$ of the groups may comprise a set of $n_i$ records $R_2^i \ldots R_{n_i}^i$ where the event that triggered the creation of record $R_1^i$ occurred before the event that triggered the creation of record $R_2^i$, and the event that triggered the creation of record $R_2^i$ occurred before the event that triggered the creation of record $R_3^i$ and so on. Using the time as event attribute may be advantageous in this example because the result of the rule may be the last event category of the sequence. This may be advantageous for trend recognition and anomaly detection. In case of trend recognition and with time-dependent association rule modelling, the frequency of occurrence of an association rule may be detected and monitored over time. This may allow for detection of trends in the underlying data (e.g., increasing frequency of occurrence of a specific rule in a specific timeframe). Hence, after detection, such trends may be actively targeted to augment the trend or to decrease the trend, depending on what is beneficial to the user. In case of anomaly detection and as opposed to trend detection, anomalies may be detected as the edge cases, where common association rules, being the identified standard procedure, are not followed. Such anomalies may result in lost opportunity or threats for organizations, as they could for instance be caused by fraud attempts, system failures, undetected blockers in user journeys (e.g., customer with a specific credit card cannot pay online), etc. Hence, anomaly detection and early anomaly investigation and resolution may provide business benefit and increased system security.

According to some embodiments, the relationship may be a causal relationship indicating that one outcome event category of the set of event categories is caused by the remaining subset of event categories of the set of event categories. The method may further comprise: monitoring the function of the entity, resulting in monitoring status records; detecting a group of monitoring status records that have the subset of event categories respectively, the detected group fulfilling the grouping criterion; and controlling the entity to prevent the occurrence of the outcome event category.

Some embodiments may be advantageous because, as with learned association rules, a system can monitor and automatically detect new emerging patterns in real-time. If patterns constitute a negative result (e.g., likelihood of disease), such an embodiment may help medical professionals diagnose a need for early prevention mechanisms (e.g., to assist the medical professional to determine the optimal treatment for a patient). On the other hand, if an association rule pattern constitutes a positive result (e.g., purchase by a customer), such a system may allow for detection of event chains with prospective positive outcome, where further measures can be activated to guide the event chain towards such an outcome.

According to some embodiments, the event attribute may comprise any one of: time of the event, location of the event, and frequency of occurrence of the event. The event attribute may further comprise any one of: a strength of signal (e.g., sound, sensory input), motion, direction of motion, angle, volume. These embodiments may be advantageous as they can be used for detecting a non-occurrence of an event despite expectation of its occurrence.

According to some embodiments, the dataset may comprise unstructured and/or structured data records. The clustering and grouping approach being used in accordance with some embodiments may enable to process different types of datasets. These embodiments may be advantageous. Firstly, mined rule sets may allow for better understanding of the underlying data and relationships among it. Second, these embodiments may enable building of association rules on unstructured data, leading to more flexibility and more application possibilities where the majority of the data exists in an unstructured format. Third, some embodiments may be used to extend systems, software and solutions in the fields of forecasting, real-time prediction, data analysis, trend detection, monitoring, and pattern and outlier detection. One example of such a system may be early warning systems that helps a medical professional monitor the status of a system, person or other entities based on the early detection of a started association rule chain that, if not intercepted beforehand, may lead to deterioration of the status or integrity of the monitored systems, persons, or entities.

According to some embodiments, the dataset may comprise unstructured records. The method may further comprise: tokenizing the unstructured records, resulting in tokens; inputting the tokens of each record to a trained machine learning model for representing the record in a vector space, resulting in each record of the dataset having a vector representation in the vector space, wherein the clustering and the grouping is performed using the vector representations.

According to some embodiments, the machine learning model is a neural network.

According to some embodiments, the clustering is performed using an unsupervised clustering algorithm.

According to some embodiments, the determined event attribute may be the time of the event, wherein the grouping criterion requires grouping the records into time buckets of variable length of time, wherein the groups are the time buckets.

According to some embodiments, the groups may be time buckets, wherein the pattern is identified by processing the time buckets via an overlapping or nonoverlapping moving window strategy.

This embodiment may enable separating data points into time buckets of variable length of time. Processing of time buckets may be done via overlapping or nonoverlapping moving window strategy. The end of a time bucket may represent a "transaction" of the list of events that occurred within the time bucket. The set of rules as system output may be time-sensitive, with patterns being more robust due to the introduced time-dependency between category events that enhance the inherent causality of the retrieved patterns. Also, the time-dimensions may extend the flexibility of the system, e.g., allowing for testing hypothesis for different time bucket lengths.

According to some embodiments, the determined event attribute may be the time of the event. The grouping may comprise: generating a subset of the dataset by selecting a subset of the event categories associated to the records in the dataset; for each record in the subset, generating a time bucket such that the end of the time bucket represents the timestamp of the each record; assigning each record in the dataset to the generated time buckets such that the timestamp of the record is within each respective time bucket. For example, a record may belong to different time buckets.

According to some embodiments, the determined event attribute may be the time of the event, wherein each group of the groups comprises a set of records that are sequential in time and represent a set of event categories respectively, wherein generating the at least one association rule may comprise: generating a list of association rules by generating at least one association rule for each group of the groups, wherein the association rule of a group is a causal relationship indicating that the last event category of the set of event categories of the group is caused by a subset of remaining causing event categories of the set of event categories; selecting association rules from the list; generating a set of rows for the selected association rules respectively, wherein each row comprises a first column and a second column, and wherein the first column of the row contains the subset of causing event categories of the corresponding association rule, and wherein the second column of the rows contains the last event category; training a machine learning model using the set of rows with the first column as an independent variable and the second column as a dependent variable respectively, wherein the machine learning model is trained to predict an event category based on input event categories, selecting association rules from the list of association rules. The method may further comprise, for each selected association rule, splitting the associated sequence of records into multiple sub-sequences of records such that the last record of the sequence is also the last record in each of the sub-sequences; adding a sub-sequence of records to a list of synthetic rules if the trained machine learning model predicts the last event category of the sub-sequence with a prediction probability exceeding a predefined threshold; and generating a set of rules by selecting synthetic rules and association rules from their respective lists.

According to some embodiments, the entity may be a production system, wherein the events may comprise status reporting events and incident events, the status reporting event providing a status report of the function of the production system, the incident event causing an incident of the production system, wherein the set of event categories comprise one or more status reporting categories and one incident category, wherein the association rule is a causal relationship between the one or more status reporting categories and the incident category.

According to some embodiments, the entity may be an individual, wherein the dataset comprises Electronic Health Record (EHR) data, wherein the events comprise health status reporting events and a health incident event, wherein the set of event categories comprises one or more health status reporting categories and one health incident category, wherein the association rule is a causal relationship between the one or more health status reporting categories and the health incident category. The EHR data may, for example, be unstructured data.

Some electronic health records may contain mostly unstructured data in textual format, e.g., descriptions of symptoms written by a physician. In such an electronic health record, one may find a sequence of different symptom descriptions (e.g., "chest pain", "high blood pressure", "nausea") from medical check-ups before a specific disease is diagnosed (e.g., "heart disease") in a subsequent hospital admission. Having mined such associations, such as the co-occurrence of these three symptoms that result in the diagnosis "heart disease", one can implement an early warning system to help medical professionals prevent this diagnosis in others. For example, a patient with "chest pain" might undergo specific screening measures to test her susceptibility of "heart disease" in the future. Also, the next event after "chest pain", which is "high blood pressure," may be proactively avoided by timely disrupting the chain of preceding symptoms with preventive measures, e.g., by presenting the symptoms and mined associations to a medical professional, and in response, the medical professional recommending a diet adjustment for a patient with suspicious "chest pain" symptoms to avoid her developing "high blood pressure" in the future.

In the above-described example of the early warning system for medical diagnoses, the time passed between the occurrence of three symptoms may help determine whether or not the occurrences of these symptoms are related to each other, e.g., being caused by the same underlying principle. Such underlying principles may be assumed to cause the association pattern between the symptoms and the diagnoses. Hence, using time-dependency may increase the causal significance of the derived associations and help to decrease the number of invalid associations learned through randomly co-occurring events over large time spans in some embodiments. Therefore, the association rule learning system in these embodiments may be extended with time dependency to improve the causal relationships of the learned association rules. This may be achieved by grouping the data points into time buckets of variable length, where each end of a time bucket is treated as a transaction. The transaction may include all events (i.e., symptom and diagnose occurrences) that occurred within the time bucket. Time buckets may be modeled using time window strategies in some embodiments, where an overlapping time window constitutes one embodiment.

According to some embodiments, the entity may be a question answering system (e.g., chatbot), wherein the dataset is a log of chat messages between the question answering system and a user, the records being the chat messages, wherein the events comprise negotiation messages and a decision event indicating a decision of the user, wherein the set of event categories comprises one or more negotiation message categories and one decision category, wherein the association rule is a causal relationship between the one or more negotiation message categories and the decision category.

FIG. 1 is a block diagram of a computing system 100 in accordance with some embodiments.

The computing system 100 comprises an orchestration component 101, which may handle the data flows within the computing system 100 providing data storage and data retrieval from the modular system components The computing system 100 may further comprise a data store component 102. The data store component 102 may persist the input data 103 and output data 104 and may enable data transactions, e.g., adding embeddings, cluster-IDs and association rules to the input data. The computing system 100 may further comprise an encoder component 105. The encoder component 105 may retrieve an unstructured data and/or structured data record from the orchestration component 101, which it transforms to an embedding. An embedding represents the content of the input as numbers in a multidimensional vector. The encoder component 105 may return the embedding to the orchestration component 101. The encoder component 105 may, for example, be an artificial neural network. The computing system 100 further comprises a clustering component 107 that may retrieve all embeddings generated in the encoder component 105 from the orchestration component 101. The clustering component 107 may apply a clustering algorithm to cluster the embeddings with high similarities together in a cluster. The clustering component 107 may return the clusters to the orchestration component 101.

The computing system 100 may further comprise an association rule learning component 109 that may retrieve the stored data containing the clusters, the unstructured data and/or structured data with their corresponding timestamps. First, the association rule learning component 109 may group the records into time buckets by applying a moving window strategy, which in at least one embodiment may be of fixed length of time. Once all records are distributed into their corresponding time bucket, an association rule learning algorithm may be applied to find sequential patterns that recur in different time buckets. A sequential pattern may be defined as an event from a specific cluster that, according to its timestamp, occurs before at least one other event from another specific cluster in at least two time buckets. The sequential pattern sequences may be of arbitrary length and, hence, may contain various event categories from different clusters. Such mined sequential patterns may be defined as association rules and may be returned to the orchestration component 101.

Figure 2:
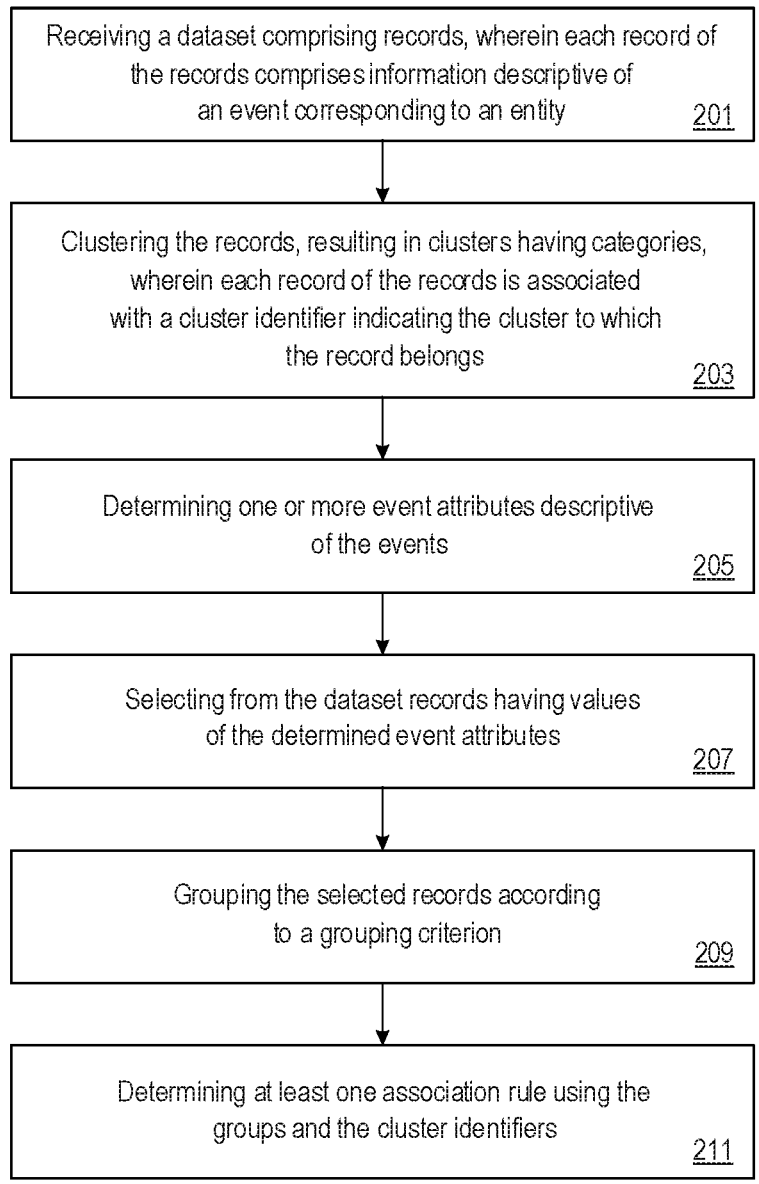
FIG. 2 is a flowchart of a method for determining association rules in accordance with some embodiments.

FIG. 2 is a flowchart of a method for determining association rules in accordance with some embodiments. For the purpose of explanation, the method described in FIG. 2 may be implemented in the system illustrated in FIG. 1, but is not limited to this implementation. The method of FIG. 2 may, for example, be performed by the computing system 100.

A dataset comprising records may be received in operation 201. Each record of the records may comprise information descriptive of an event corresponding to an entity. The entity may, for example, be an individual, production system, etc. The dataset (e.g., the entity) may belong to a domain of interest of a user of the present method. The domain may represent concepts or categories which belong to a part of the world, such as biology or politics. The domain may model domain-specific definitions of terms. For example and not by way of limitation, a domain may refer to healthcare, advertising, commerce, medical, chemical, physical, computer science, oil-and-gas, transportation, financial and/or biomedical-specific field.

The dataset may be received from a local database of the computing system or from a remote database system that is remotely connected to the computing system 100. The dataset may, automatically, be received or may be received upon request, e.g., the computing system 100 may query the remote database system to receive the dataset. Automatically receiving the dataset may enable streamlining the present method to quickly detect rules. Receiving datasets upon request may enable a controlled execution of the present method.

The dataset may comprise unstructured and/or structured records. For example and not limitation, the dataset may comprise records of chat logs, IT ticketing systems, electronic health records, web, search engine search results, system error logs, delivery notes in supply chain data, etc. In one example, operation 201 may further comprise selecting a type of records to be used, wherein the received dataset has the selected type of records.

Figure 6:
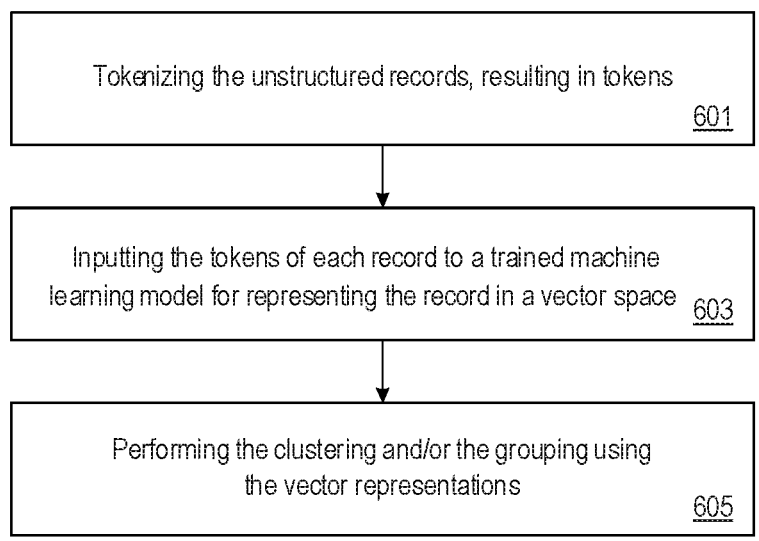
FIG. 6 is a flowchart of a method for clustering and/or grouping unstructured records in accordance with some embodiments.

The records may be clustered in operation 203. Each resulting cluster may be a group of related records that represent the same event category. For example, a data mining analysis may be performed to discover implicit meanings represented by the records and the records may be clustered based on that. In one example, the records may be clustered based on some similarity measure in such a way that records in the same cluster are more similar to each other than to those in other clusters. The similarity measure may, for example, may select records that are the result of similar events. The clustering may, for example, be performed using a text clustering algorithm. This operation 203 may result in clusters having categories respectively, wherein each cluster category is indicative of an event category of the events. Each record of the records may be associated with a cluster identifier indicating the cluster to which the record belongs in some embodiments. FIG. 6 provides an example implementation of the clustering in operation 203.

One or more event attributes descriptive of the events may be determined in operation 205. For example, it may be decided whether or not to perform the analysis using time attributes, location attributes, etc. These embodiments may be advantageous because the association rule may be generated based on a vast variety of attributes. This is by contrast to a method that is limited to one type of attributes that uses it automatically without requiring any selection as with the present method.

In operation 207, records having values of the determined event attributes may be selected from the dataset.

Figure 7:
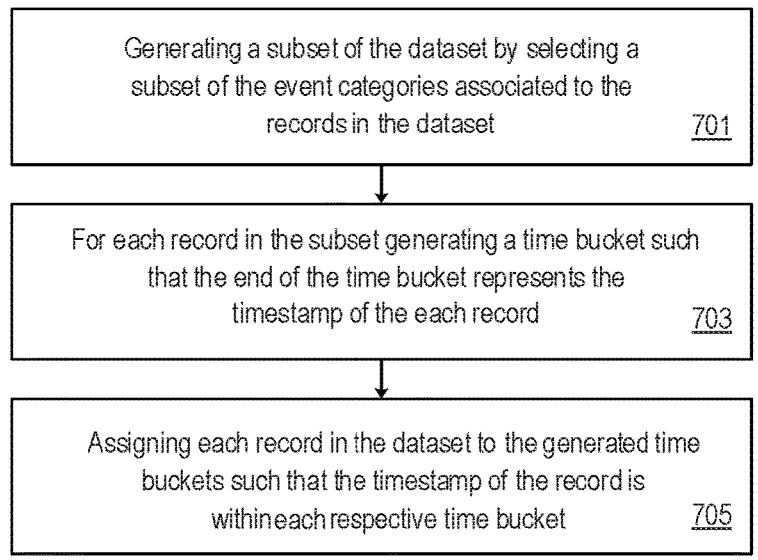
FIG. 7 is a flowchart of a method for grouping records in accordance with some embodiments.

The selected records may be grouped in operation 209 according to a grouping criterion. The grouping criterion may be based on the values of the determined event attributes. The grouping results in groups, wherein each group may comprise a set of records representing respective ones of the event categories. FIGS. 6 and 7 provide example methods for grouping the records.

Figure 3:
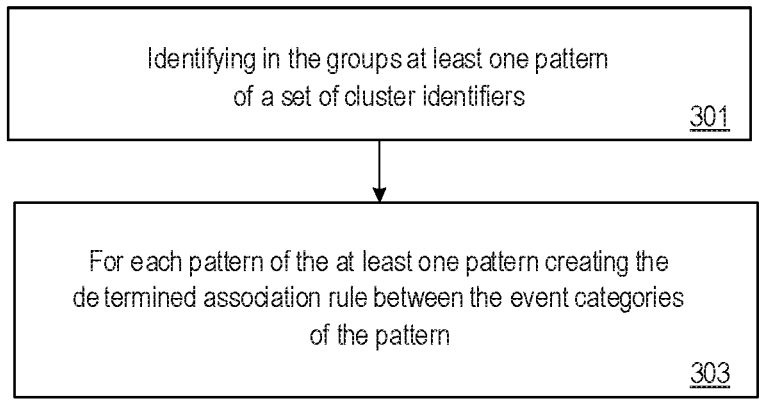
FIG. 3 is a flowchart of a method for determining association rules in accordance with some embodiments.
Figure 4:
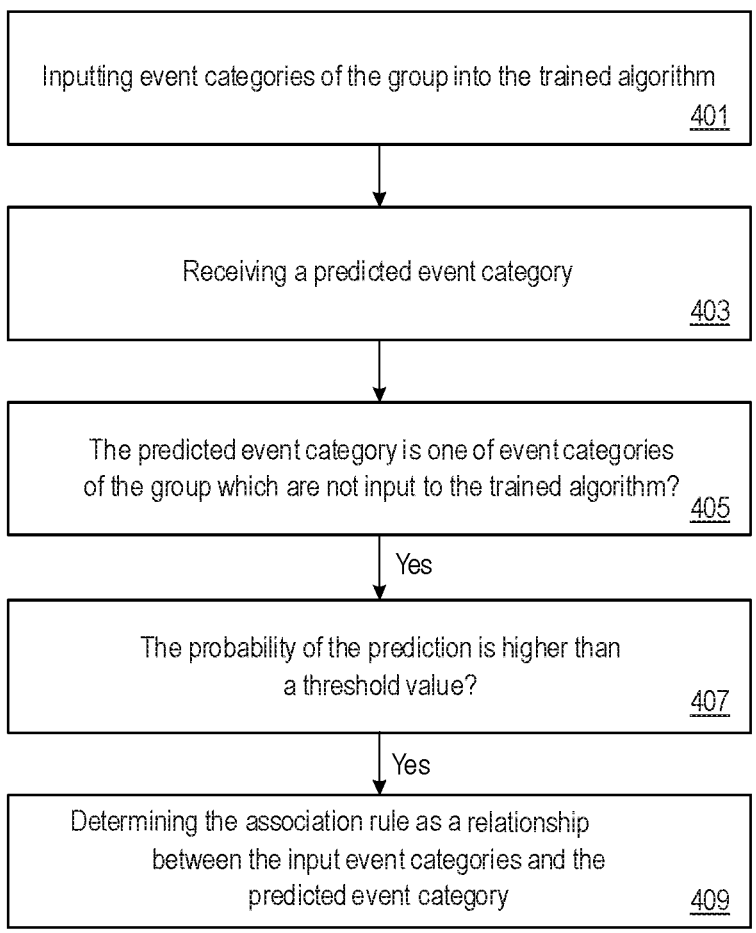
FIG. 4 is a flowchart of a method for determining association rules in accordance with some embodiments.

At least one association rule may be determined in operation 211 using the groups and the cluster identifiers, wherein each association rule may indicate a relationship between the event categories of a respective group. The association rule may be determined using an automatic tool or may be determined using a graphical user interface. For example, the groups and their clusters identifiers may be displayed on a graphical user interface, e.g., groups having the same cluster identifiers may be marked or highlighted on the graphical user interface. An input may be received via the graphical user interface indicating the at least one association rule. FIGS. 3 and 4 provide further examples for the determining association rules in operation 211.

FIG. 3 is a flowchart of a method for determining an association rule in accordance with some embodiments. For the purpose of explanation, the method described in FIG. 3 may be implemented in the system illustrated in FIG. 1, but is not limited to this implementation. The method of FIG. 3 may, for example, be performed by the computing system 100. The method of FIG. 3 provides an example implementation of operation 211 of FIG. 2. The method of FIG. 3 may receive as input groups of records. The groups of records (associated with cluster identifiers) may be obtained by the method of FIG. 2 or other grouping methods.

At least one pattern of a set of cluster identifiers may be identified in operation 301 in the groups. The pattern is defined by at least two groups of the groups, wherein each group defining the pattern comprises a set of records having said set of cluster identifiers. For each pattern of the at least one pattern an association rule between the event categories of the pattern may be created in operation 303.

FIG. 4 is a flowchart of a method for determining an association rule in accordance with some embodiments. For the purpose of explanation, the method described in FIG. 4 may be implemented in the system illustrated in FIG. 1, but is not limited to this implementation. The method of FIG. 4 may, for example, be performed by the computing system 100. The method of FIG. 4 provides an example implementation of operation 211 of FIG. 2. The groups of records (associated with cluster identifiers) may be obtained by the method of FIG. 2 or other grouping methods.

Operations 401 to 409 may be performed for each group of the groups. Event categories of the group may be input in operation 401 into a trained algorithm. In response to inputting the event categories, a predicted event category may be received in operation 403. It may be determined (inquiry operation 405) whether or not the predicted event category is one of the event categories of the group that are not input to the trained algorithm.

In case the predicted event category is one of event categories of the group that are not input to the trained algorithm, it may be determined (inquiry operation 407) whether or not a probability of the prediction is higher than a threshold value.

In case the probability of the prediction is higher than the threshold value, an association rule may be defined in operation 409 as a relationship between the input event categories and the predicted event category. The relationship may indicate a correlation that the trained algorithm has learned. The relationship may be referred to as a prospective causal relationship or co-occurrence/correlation relationship or a causal relationship.

In case the probability of the prediction is smaller than the threshold value or the predicted event category is not one of event categories of the group that are not input to the trained algorithm, then the group may not provide any association rule.

Figure 5:
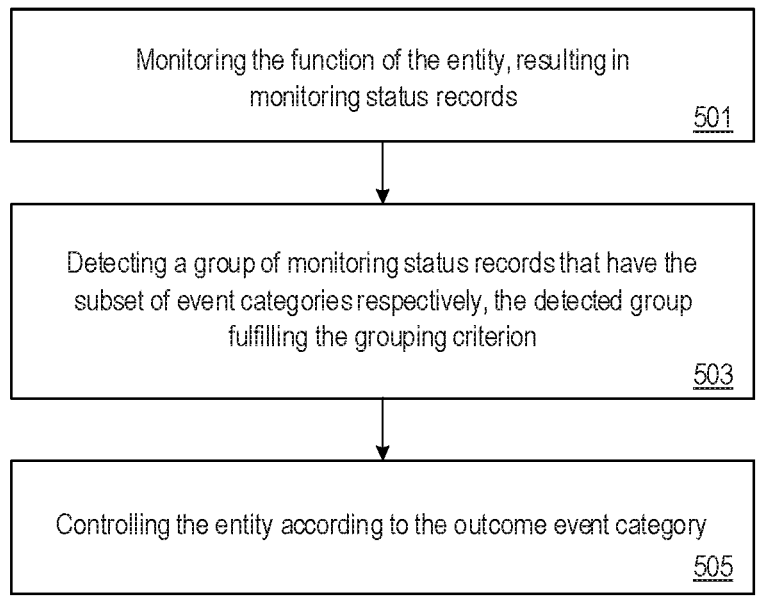
FIG. 5 is a flowchart of a method for controlling an entity in accordance with some embodiments.

FIG. 5 is a flowchart of a method for controlling an entity in accordance with some embodiments. For the purpose of explanation, the method described in FIG. 5 may be implemented in the system illustrated in FIG. 1, but is not limited to this implementation. The method of FIG. 5 may, for example, be performed by the computing system 100. The method of FIG. 5 may, for example, receive as input at least one association rule of the entity which are determined by the method of FIG. 2 or by other methods. For simplification of the description, only one association rule is considered. The association rule is a relationship between a subset of event categories and one outcome event category.

The function of the entity may be monitored in operation 501. This may result in monitoring status records that have been created while the monitoring is performed.

A group of monitoring status records that have the subset of event categories respectively may be detected in operation 503. For example, while monitoring the grouping method described in operation 209 based on the grouping criterion may be performed, wherein the detected group is one of those groups.

The function of the entity may be controlled in operation 505 to prevent the occurrence of the outcome event category or to enhance the outcome event category.

FIG. 6 is a flowchart of a method for clustering and/or grouping unstructured records in accordance with some embodiments. For the purpose of explanation, the method described in FIG. 6 may be implemented in the system illustrated in FIG. 1, but is not limited to this implementation. The method of FIG. 6 may, for example, be performed by the computing system 100.

The unstructured records may be tokenized in operation 601 resulting in tokens. The tokens of each record may be input in operation 603 to a trained machine learning model for representing the record in a vector space. This may result in each record of the records having a vector representation in the vector space. The clustering operation 203 and/or the grouping operation 209 may be performed using the vector representations in operation 605.

FIG. 7 is a flowchart of a method for grouping records of a dataset in accordance with some embodiments. For the purpose of explanation, the method described in FIG. 7 may be implemented in the system illustrated in FIG. 1, but is not limited to this implementation. The method of FIG. 7 may, for example, be performed by the computing system 100.

A subset of the dataset may be generated in operation 701 by selecting a subset of the event categories associated to the records in the dataset. For each record in the subset, a time bucket may be generated in operation 703 such that the end of the time bucket represents the timestamp of the record. Each record in the dataset may be associated in operation 705 to the generated time buckets such that the timestamp of the record is within each respective time bucket.

Figure 8:
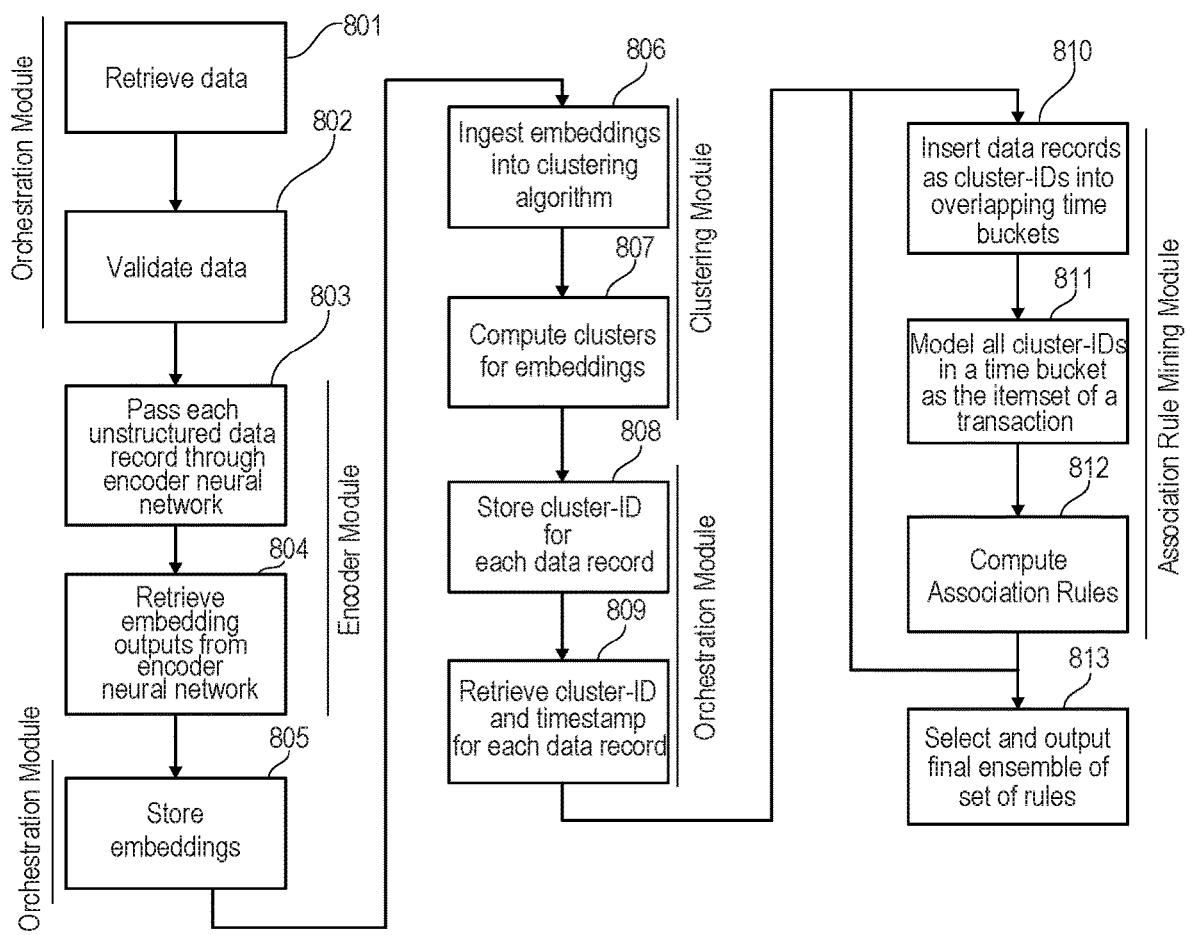
FIG. 8 is a flowchart of a method for determining association rules in accordance with some embodiments.

FIG. 8 is a flowchart of a method for determining association rules in accordance with some embodiments. For the purpose of explanation, the method described in FIG. 8 may be implemented in the system illustrated in FIG. 1, but is not limited to this implementation. The method of FIG. 8 may, for example, be performed by the computing system 100.

The method of FIG. 8 may enable generation of time-sensitive rules from unstructured records, e.g., the event attribute being used is the time of the events. The described embodiment may be advantageous as it may enable an association rule learning system for unstructured (e.g., textual) data for time dependent association rule learning based on time buckets.

The unstructured records (e.g., PDF documents) of a dataset may be retrieved in operation 801 and validated in operation 802 by the orchestration component 101. The unstructured records may be transformed into a vectorized representation format, which may, for example, be achieved by passing in operation 803 the data through a neural network that encodes the data and returns embedding vectors in operation 804. Operations 803 and 804 may, for example, be performed by the encoder component 105.

The embeddings may be stored in operation 805 by the orchestration component 101. Next, the encoded data is clustered into categories by a clustering algorithm. This may be performed by ingesting. by the clustering component 107 in operation 806, the embeddings into the clustering algorithm such that the clustering algorithm may compute in operation 807 the clusters for the embeddings. The orchestration component 101 may store in operation 808 the cluster ID for each record. After clustering, the orchestration component 101 may retrieve in operation 809 the stored cluster IDs and timestamps of each record. The records may be inserted as cluster IDs into overlapping time buckets in operation 810. Some or all cluster IDs in a time bucket may be modelled in operation 811 as the itemset of a transaction. The association rules may be computed in operation 812 by, for example, ingesting into an association rule learning algorithm to retrieve association rules between cluster categories. Operations 810 to 812 may be performed by the association rule learning component 109. The association rules may be provided in operation 813.

Figure 9:
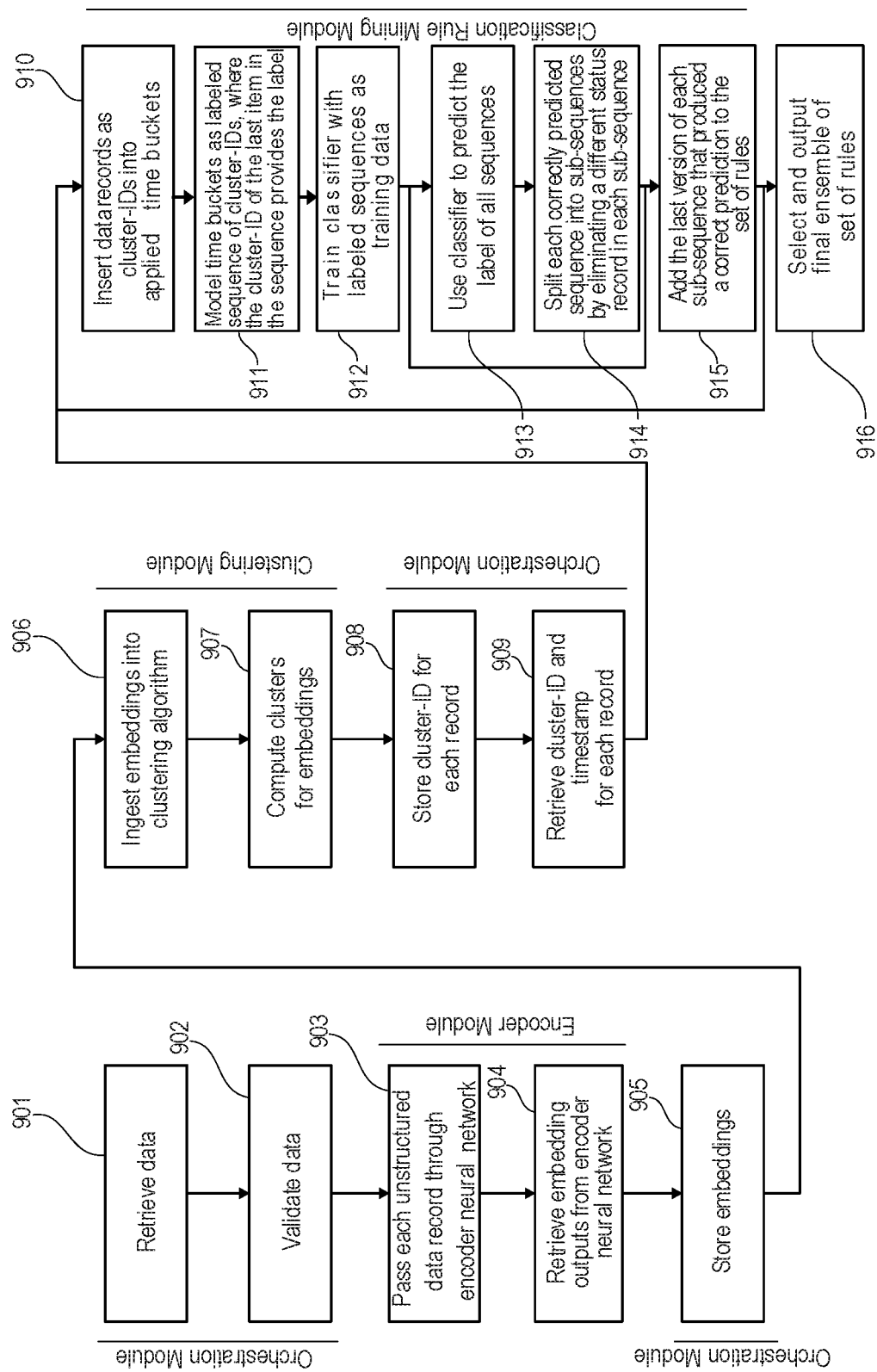
FIG. 9 is a flowchart of a method for determining association rules in accordance with some embodiments.

FIG. 9 is a flowchart of a method for determining association rules in accordance with some embodiments. For the purpose of explanation, the method described in FIG. 9 may be implemented in the system illustrated in FIG. 1, but is not limited to this implementation. The method of FIG. 9 may, for example, be performed by the computing system 100.

The method of FIG. 9 may enable the generation of time-sensitive rules from unstructured records. In some embodiments, the event attribute being used may be the time of the events. The unstructured records (e.g., PDF documents) of a dataset may be retrieved in operation 901 and validated in operation 902 by the orchestration component 101. The unstructured records may be transformed into a vectorized representation format, which may, for example, be achieved by passing (in operation 903) the data through a neural network that encodes the data and returns embedding vectors in operation 904. Operations 903 and 904 may, for example, be performed by the encoder component 105. The embeddings may be stored in operation 905 by the orchestration component 101.

Next, the encoded data may be clustered into categories by a clustering algorithm. This may be performed by ingesting by the clustering component 107 in operation 806 the embeddings into the clustering algorithm such that the clustering algorithm may compute in operation 907 the clusters for the embeddings. The orchestration component 101 may store in operation 908 the cluster ID for each record. After clustering, the orchestration component 101 may retrieve in operation 909 the stored cluster IDs and timestamps of each record. The records may be inserted as cluster IDs into overlapping time buckets in operation 910. The time buckets may be modelled in operation 911 as labelled sequence of cluster-IDs, where the cluster-ID of the last item in the sequence provides the label. A classifier may be trained in operation 912 with the labelled sequences as training data. The classifier may be used in operation 913 to predict the label of all sequences. Each correctly predicted sequence may be split in operation 914 into sub-sequences by eliminating a different status record in each sub-sequence. The last version of each sub-sequence that produced a correct prediction may be added in operation 915 to a set of association rules. The set of association rules may be provided in operation 916.

Figure 10:
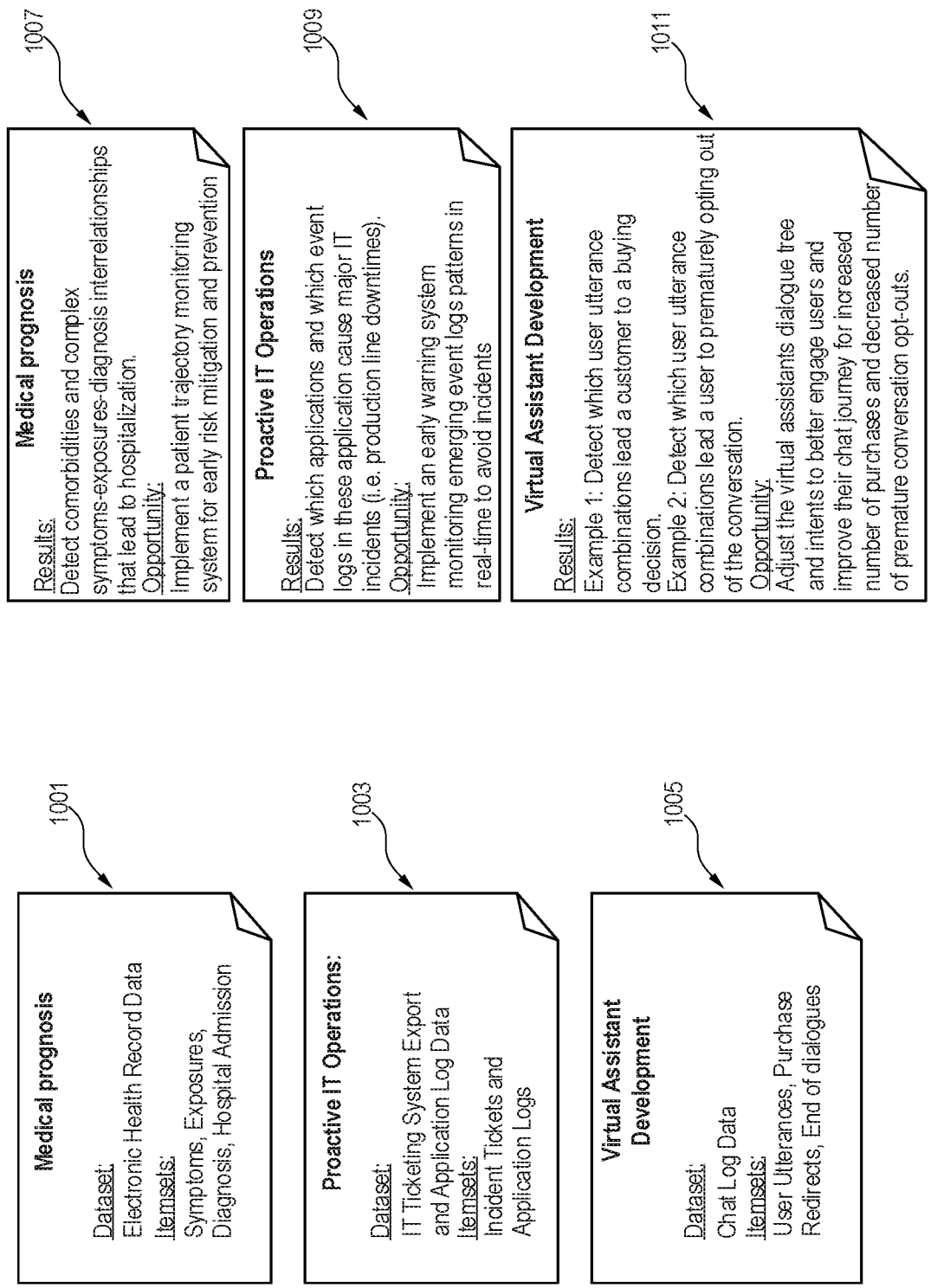
FIG. 10 is an example of input and output data in accordance with some embodiments.

FIG. 10 shows examples of unstructured records 1001, 1002 and 1003. Each of the unstructured records 1001, 1002 and 1003 in this example is associated with a different entity. Operation 801 or 901 of FIGS. 8 and 9 may process one type of these unstructured records at a time.

In the first use-case of FIG. 10, the system 100 may be fed with data 1001 from Electronic Health Records (EHR), which may comprise mostly textual descriptions and dates of a patient's interaction with healthcare providers. Such descriptions may include diagnostics, medication, syndromes, exposures, and other information written down and stored by health professionals during or after treating the corresponding patient. Using this as input data to the association rule mining system, sequential patterns may be extracted, such as symptom to diagnosis chains as shown with record 1007. As mentioned before, consider the association pattern, where for example "chest pain", "high blood pressure", and "nausea" may be clustered categories that are followed by the category "heart disease". If this pattern repeats itself over a significant number (e.g., more than two times) of patient-specific electronic health records, then it may be a candidate to be integrated into early warning systems to assist medical professionals to make a diagnosis and recommend a treatment. In this example, an EHR-ID may be added to not mix the EHR data from different patients in the time buckets in the association rule mining component 109.

The second example describes data 1003 from and for proactive IT operation systems, which may be used in large production plants. For example, consider that in a production plant, many different IT applications may be deployed that create application logs. There may be many different error logs and exceptions with timestamps that arise in the log files. However, only few of them may cause costly incidents that affect the production plant and its operations, e.g., the production stops, causing many lost units and high financial costs for the manufacturing company. If log and incident data is the input into some embodiments, the system may categorize such data and may derive rules as to which categories of log data cause costly incidents. By adding time dependency with time buckets, the association rules may reveal hidden links between logs and incident data. Ingesting such mined rules into a proactive IT operations system may enable the early detection of sequences of logs 1009 that lead to major incidents, which in turn, may enable early mitigation resulting in prevention and cost-saving.

The third example illustrates a chat scenario, where the association rule mining system may be used to detect patterns in chats log input data 1005. For instance, consider a chat with a potential customer, where a dialogue is a sequence of messages, and where the final message in the dialogue either constitutes a buying decision or an opt-out of the customer. In a dataset with many such dialogues, the chat messages contain timestamps and are encoded, and clustered into categories. Association rule mining finds the recurring patterns of specific chat messages 1011 that lead to buying decision or opt-out. With this information at hand, the chat agent or modeler may enforce the types of messages that lead to a buying decision and may avoid the ones that lead to a premature opt-out of the potential customer. Note that the chat scenario example describes a specific example of some embodiments, where a Dialogue-ID may be added to not mix the dialogue data from different customers in the time buckets in the association rule mining component 109.

Figure 11:
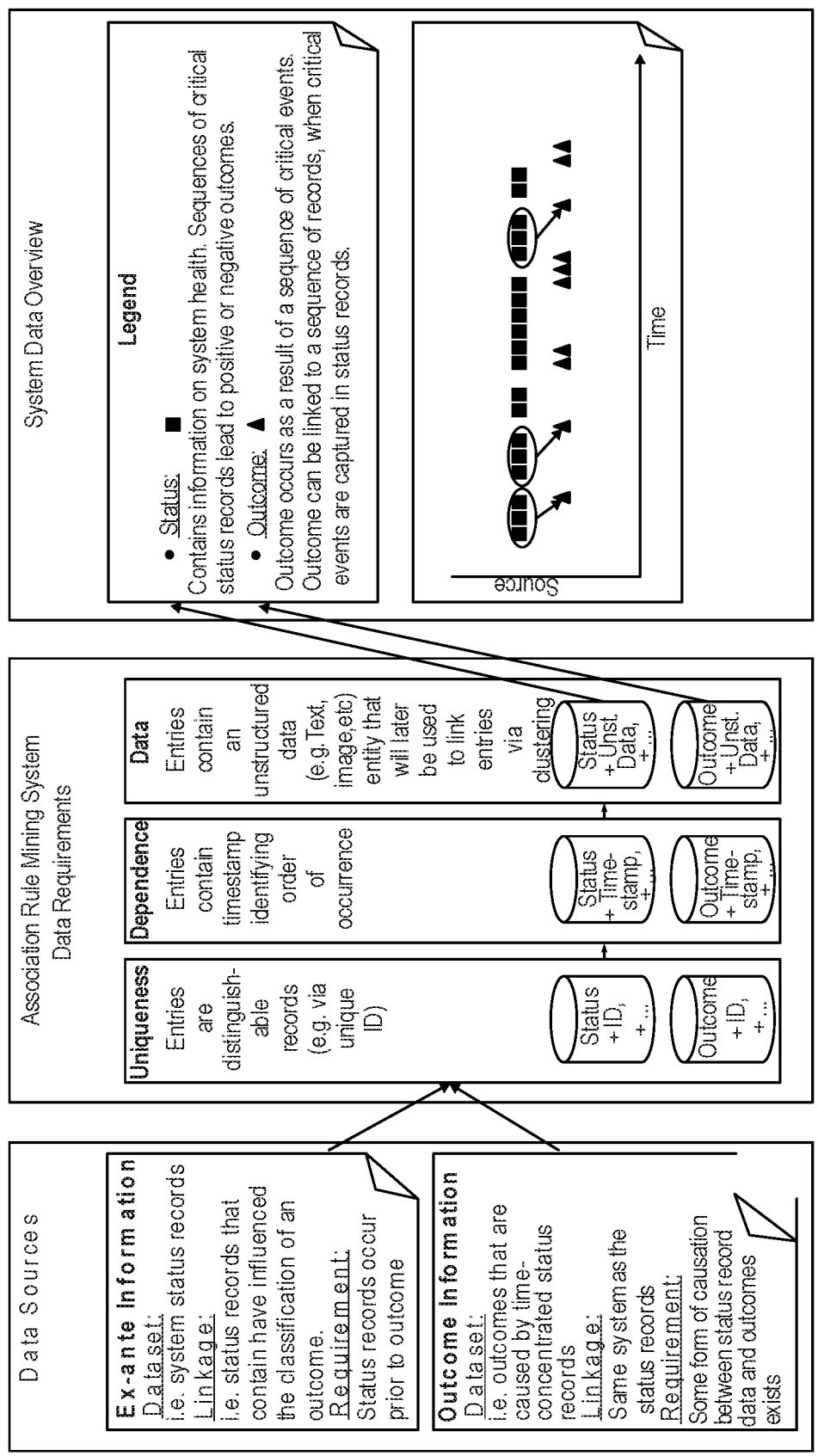
FIG. 11 is a diagram illustrating a method for preparing the dataset of records in accordance with some embodiments.

FIG. 11 is a diagram illustrating a method for preparing the dataset of records that can be processed by some embodiments, e.g., method of FIG. 2.

The dataset may be separated according to this method into outcomes and status reports. If outcome and status reports are separated in the dataset, the output of some embodiments (e.g., as shown with the plot) may be a list of status report sequences, where each sequence ends with an outcome event. The status and outcome entries may be obtained from data sources, wherein these data sources may need to have the same origin, e.g., symptoms and diagnosis belong to the same patient or IT events and incidents belong to the same production plant. These embodiments may be advantageous, as linkage of the data points can be assumed in this case. Moreover, data entries may be provided with event attributes such as a timestamp of occurrence. Also, each of the data entries may be uniquely identifiable. Also, the data collection strategy of the unstructured data in some embodiments may remain unchanged. This, then, may lead to consistent encoding and classification of the data in categories. These embodiments may be advantageous because an association rule learning may aim to infer rules of co-occurring categories from status entries and corresponding outcomes in a related time frame. This preparation of the dataset may be performed as illustrated in FIG. 11, wherein each data record (e.g., a row in a table) may have the following information (e.g., as columns in a table): a uniqueness entry (e.g., ID), an associated time entry (e.g., timestamp), and an unstructured data entry (e.g., a text input). The unstructured data entry may be encoded as vector. The encoder, such as an artificial neural network, may be trained to handle various types of unstructured data. Hence, the only data condition for the unstructured data may be that it follows an internal structure of patterns that allows for categorization. For example, text has such an internal structure commonly referred to as semantics. In sum, as long as the data contains learnable patterns that a neural network encoder can represent, the type of unstructured data is flexible and depends on the use-case. It could be of, e.g., type text, documents, logs, sequences, sensor data, images, video, audio, etc.

Figure 12:
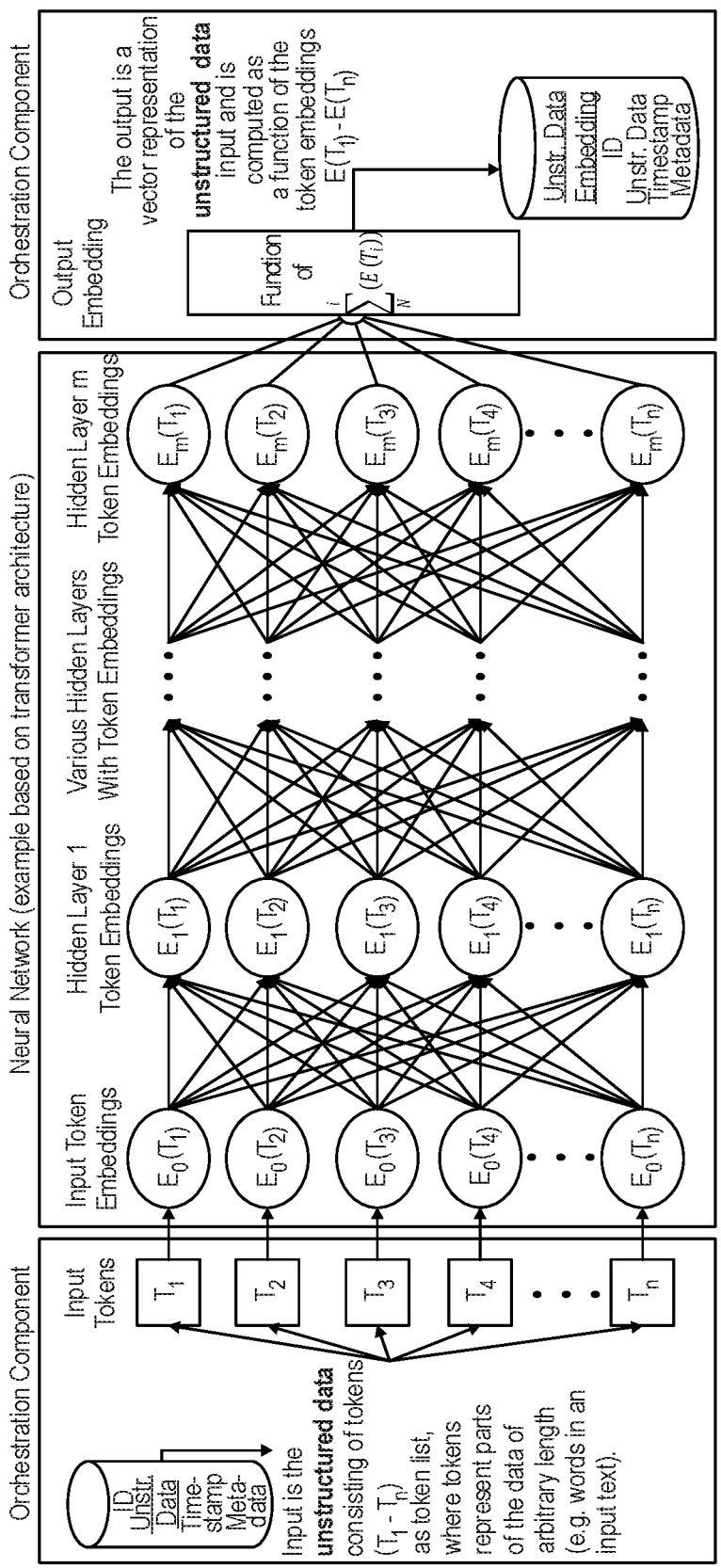
FIG. 12 is a diagram illustrating a method for generating embeddings from unstructured records in accordance with some embodiments.

FIG. 12 is a diagram illustrating a method for generating embeddings from unstructured records in accordance with some embodiments.

The encoder component may be used to perform the method of FIG. 12. The encoder may transform unstructured data into a structured format. For this transformation, an encoder model M is used. The encoder M may be an artificial neural network (ANN) that has learned an efficient data encoding for the type of unstructured data that is fed into the system 100 as input. The ANN encoder may be, for example, VGG3 and Xception4 for image data or the Bidirectional Encoder Representations from Transformers (BERT) and the Universal Sentence Encoder for textual data. FIG. 12 illustrates the ANN encoder for unstructured data of textual format, such as in EHRs, IT Ticketing Data and Chat logs, where the input to the ANN encoder is a sequence of words S. The encoder may transform this sequence S into a multidimensional vector that contains numbers. This multidimensional vector may be the output of the encoder M and is henceforth referred to as embedding E. Embedding E may be computed as the output of a function $\varphi(M, S)$ of the input S and the model M. This function may be embodied as a mean, concatenation, or sum of several internal token-level embeddings generated by M, as illustrated by FIG. 12. This function may also be embodied by any other output of M. For example, one or several internal character, token, word, or text level embeddings in one or several hidden layers of M may encode a relevant part of the meaning of sequence S and, hence, can be used as E. Internally, the encoder M may place the input text S at a specific location in a multidimensional embedding space. If all unstructured input data of the status reports is placed in the vector space, clustering techniques may learn the densities and/or distances between these data points and, hence, categories them into different clusters based on their vector space location.

Figure 13:
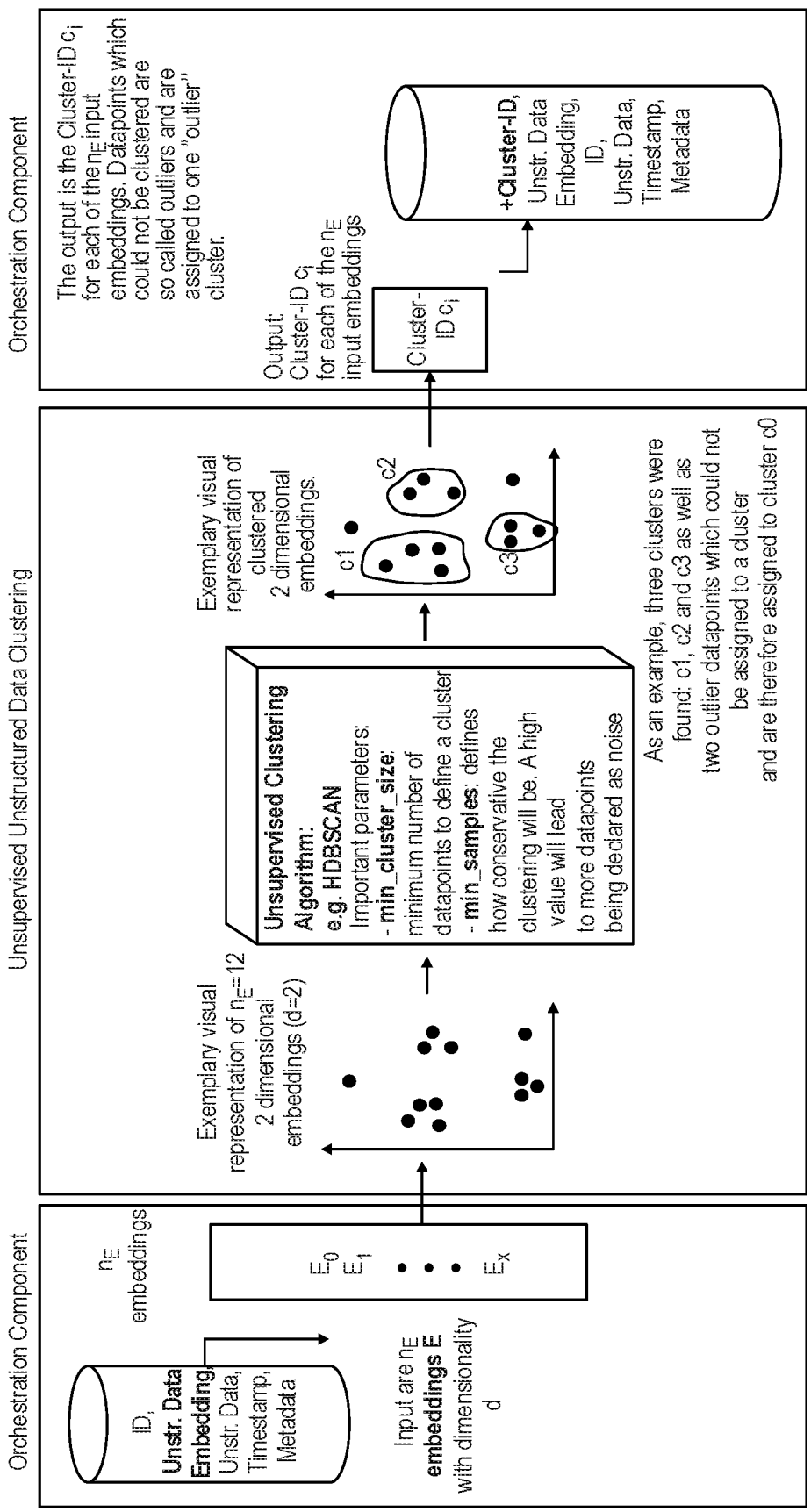
FIG. 13 is a diagram illustrating a method for clustering records in accordance with some embodiments.

FIG. 13 is a diagram illustrating a method for clustering records in accordance with some embodiments. The method of FIG. 13 may, for example, be performed by the clustering component 107.

The clustering component 107 may append a cluster ID to each of the status reports. The inputs for the clustering algorithm may be the encoded unstructured data entries of the corresponding status reports. As visualized in FIG. 13, the orchestration component 101 may pass the list of $n_E$ embeddings E into the clustering component 107, where each embedding E may be a vector representation of a status report or outcome. Each embedding E may be of dimensionality d, where d is a fixed parameter of the underlying encoder component 107. This data bulk of length $n_E$ may be ingested into the clustering algorithm, which may find relatedness among certain data points in an unsupervised way and may assign corelated data points to the same cluster. The output may be a list of cluster IDs, where each ID belongs to one input data point. Each of the clusters may define a category, where each status report may be assigned to one category $C_S$. In case the input data is split up into status reports and outcomes, outcomes may be clustered separately, and outcome categories may be defined as $C_O$. In one example, embeddings that may not be assigned to a cluster may be assigned to an outlier cluster. Finally, the resulting categories $C_S$ and $C_O$ may be passed back as cluster-ids to the orchestration component 101 for further processing.

Figure 14:
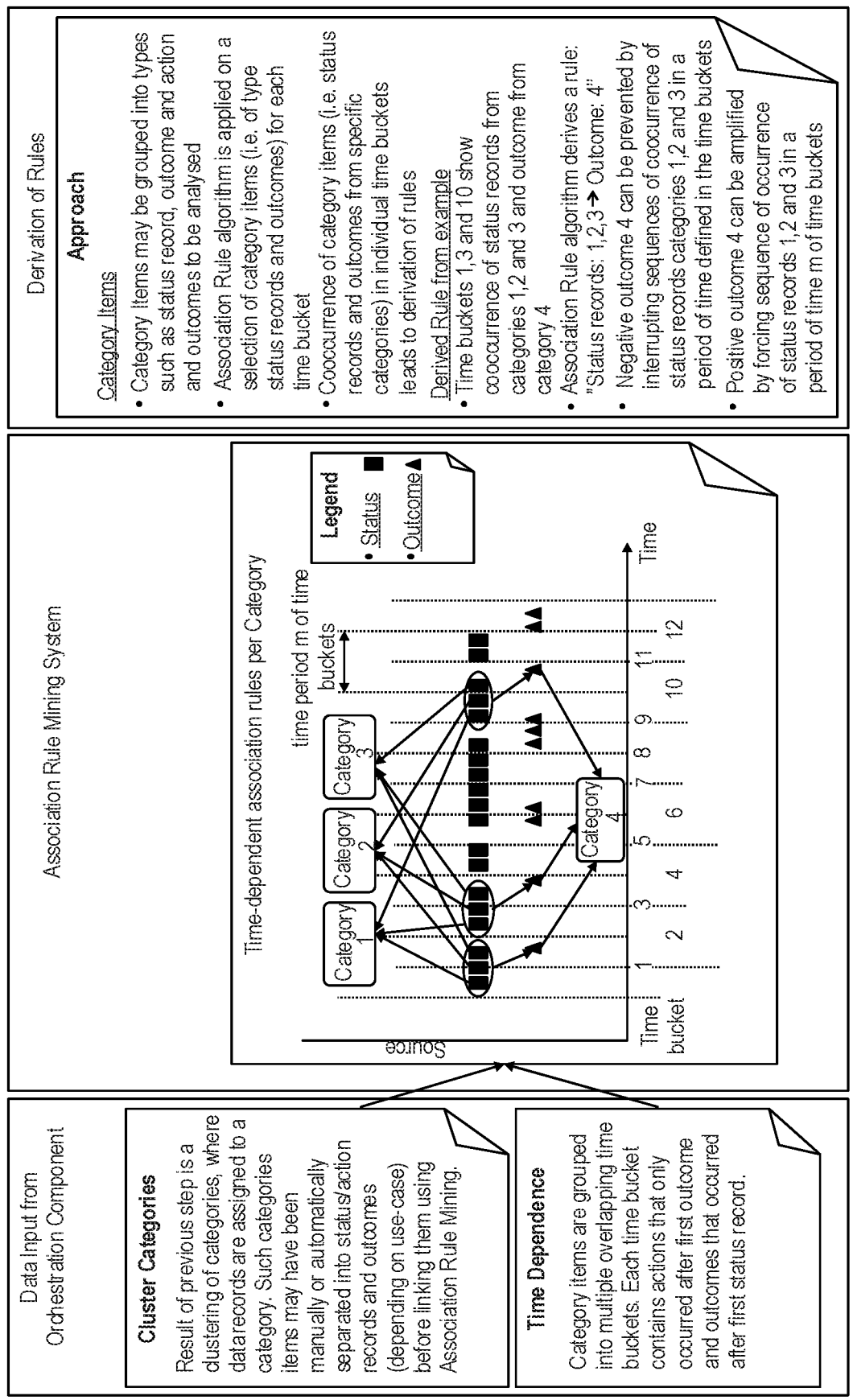
FIG. 14 is a diagram illustrating a method for derivation of association rules in accordance with some embodiments.

FIG. 14 is a diagram illustrating a method for derivation of association rules in accordance with some embodiments. The method of FIG. 14 may, for example, be performed by the association rule learning component 109.

The association rule mining component 109 may retrieve the encoded unstructured data and may split it into time buckets based on the associated time stamps of the unstructured data entry. As described in FIG. 14, the time buckets may be modelled as sliding overlapping time windows.

Apart from time bucket generation, the association rule learning component 109 may also use an association rule mining algorithm to determine frequent itemsets across time buckets. A frequent itemset may be found if, in at least two different time buckets, the same sequence of at least two status reports from at least two different cluster categories is found. If the example contains outcomes besides status reports, then the last item of the itemset may need to be an outcome. Hence, cluster categories may represent the topic/type of the status reports or outcome. The timestamps of the status reports or outcomes may be used to place them in a time bucket and, within a time bucket, into a time-series sequence of status reports/outcomes. As described by FIG. 14, patterns (e.g., defined by categories 1, 2, 3 and 4), thus, may be recurring sub-parts of such a time-series sequence that occur in more than one time bucket.

The following provides an example process and computations that may be used in the association rule mining component to create time-sensitive association rules:

- a dataset may be provided. The dataset comprises status records S with individual status entries $s_i$, ($s_i \in S$) and outcomes O with individual outcome entries $o_i$, ($o_i \in O$).
- Encoding and clustering stages may process status records S and outcomes O separately and generate categories $C_{s_i}$, ($C_{s_i} \in C_s$) for the status records and $C_{o_i}$, ($C_{o_i} \in C_o$) for the outcomes.
- Each status entry $s_i$, may be assigned to exactly one category $C_{s_i}$.
- Each outcome entry $o_i$, may be assigned to exactly one category $C_{o_i}$.
- Time-sensitive buckets $b_i$, (b, E B) may be formed with category information $C_s$ and $C_o$ of status entries $s_i$, and outcome entries $o_i$, that have occurred in a time frame $[t_i, t_i+z]$, ($t_i \in T$) with time interval z.
- Be $\phi(A,B,C_s,C_o)$ a function of the association rule learning algorithm A that generates n association rules $r_i$, ($r_i \in R$) based on $n_{c_s}$ status report categories $C_s$, and $n_{c_o}$ may outcome categories $C_o$.
- The association rule collection R may be one output of the association rule learning component.

Figure 15:
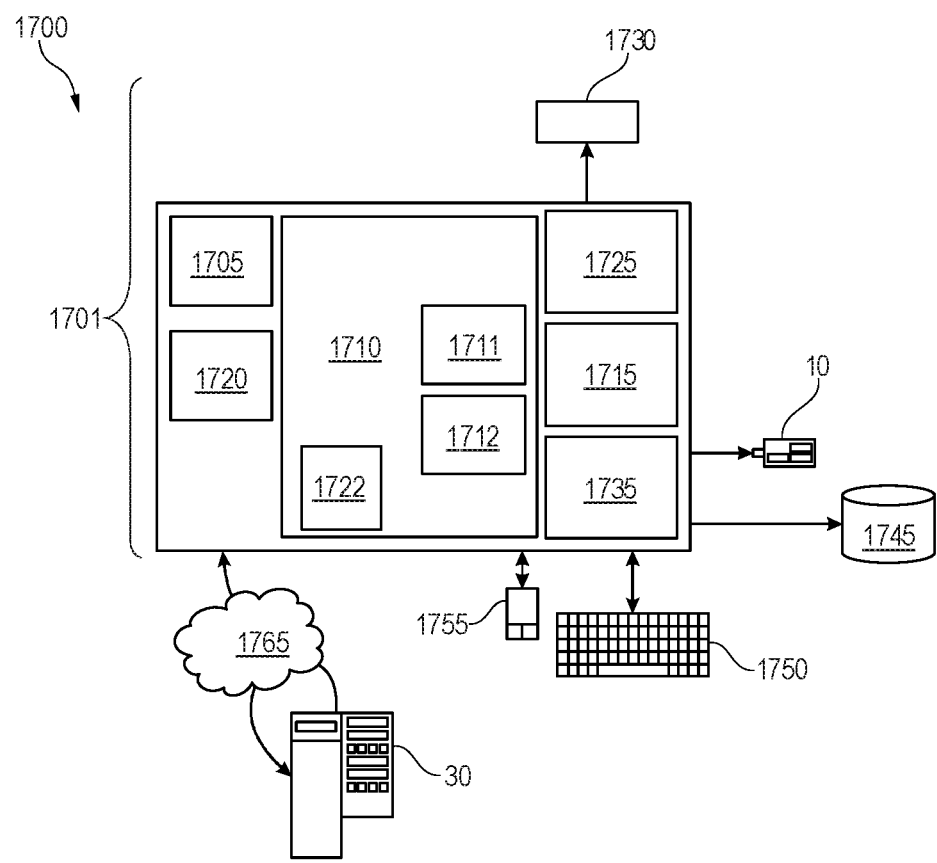
FIG. 15 represents a computerized system, suited for implementing one or more method operations in accordance with some embodiments.

FIG. 15 represents a general computerized system 1700 suited for implementing at least part of method operations as involved in the disclosure.

The methods described herein are at least partly non-interactive, and automated by way of computerized systems, such as servers or embedded systems. In example embodiments though, the methods described herein may be implemented in a (partly) interactive system. These methods may further be implemented in software 1712, 1722 (including firmware 1722), hardware (processor) 1705, or a combination thereof. In example embodiments, the methods described herein may be implemented in software, as an executable program, and is executed by a special or general-purpose digital computer, such as a personal computer, workstation, minicomputer, or mainframe computer. The most general system 1700, therefore, may include a general-purpose computer 1701.

In example embodiments, in terms of hardware architecture, as shown in FIG. 15, the computer 1701 may include a processor 1705, memory (main memory) 1710 coupled to a memory controller 1715, and one or more input and/or output (I/O) devices (or peripherals) 10, 1745 that may be communicatively coupled via a local input/output controller 1735. The input/output controller 1735 may be, but is not limited to, one or more buses or other wired or wireless connections. The input/output controller 1735 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein, the I/O devices 10, 1745 may include a generalized cryptographic card or smart card.

The processor 1705 may be a hardware device for executing software, particularly that stored in memory 1710. The processor 1705 may be any custom made or commercially available processor, a central processing unit (CPU), an auxiliary processor among several processors associated with the computer 1701, a semiconductor-based microprocessor (in the form of a microchip or chip set), or generally any device for executing software instructions.

The memory 1710 may include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). The memory 1710 may have a distributed architecture, where various components are situated remote from one another, but can be accessed by the processor 1705.

The software in memory 1710 may include one or more separate programs, each of which comprises an ordered listing of executable instructions for implementing logical functions, including functions involved in embodiments of this disclosure. In the example of FIG. 15, software in the memory 1710 may include instructions 1712, e.g., instructions to manage databases such as a database management system.

The software in memory 1710 may also include an operating system (OS) 1711. The OS 1711 may control the execution of other computer programs, such as possibly software 1712 for implementing methods as described herein.

The methods described herein may be in the form of a source program 1712, executable program 1712 (object code), script, or any other entity comprising a set of instructions 1712 to be performed. When a source program, then the program may be translated via a compiler, assembler, interpreter, or the like, which may or may not be included within the memory 1710, so as to execute in connection with the OS 1711. Furthermore, the methods may be written as an object-oriented programming language, which has classes of data and methods, or a procedure programming language, which has routines, subroutines, and/or functions.

In example embodiments, a conventional keyboard 1750 and mouse 1755 may be coupled to the input/output controller 1735. Other devices, such as the I/O devices 1745, may include input devices, for example but not limited to a printer, a scanner, microphone, and the like. Finally, the I/O devices 10, 1745 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 1745 may be any generalized cryptographic card or smart card. The system 1700 may further include a display controller 1725 coupled to a display 1730.

In example embodiments, the system 1700 may further include a network interface for coupling to a network 1765. The network 1765 may be an IP-based network for communication between the computer 1701 and any external server, client, and the like via a broadband connection. The network 1765 may transmit and receive data between the computer 1701 and external systems 30, which may be involved to perform part, or all of the operations of the methods discussed herein. In example embodiments, network 1765 may be a managed IP network administered by a service provider. The network 1765 may be implemented in a wireless fashion, e.g., using wireless protocols and technologies, such as WiFi, WiMax, etc. The network 1765 may also be a packet-switched network such as a local area network, wide area network, metropolitan area network, Internet network, or other similar type of network environment. The network 1765 may be a fixed wireless network, a wireless local area network W(LAN), a wireless wide area network (WWAN), a personal area network (PAN), a virtual private network (VPN), intranet or other suitable network system and includes equipment for receiving and transmitting signals.

If the computer 1701 is a PC, workstation, intelligent device or the like, the software in the memory 1710 may further include a basic input output system (BIOS) 1722. The BIOS may be a set of software routines that initialize and test hardware at start-up, start the OS 1711, and support the transfer of data among the hardware devices. The BIOS may be stored in ROM so that the BIOS can be executed when the computer 1701 is activated.

When the computer 1701 is in operation, the processor 1705 may be configured to execute software 1712 stored within the memory 1710, to communicate data to and from the memory 1710, and to generally control operations of the computer 1701 pursuant to the software. The methods described herein and the OS 1711, in whole or in part, may be read by the processor 1705, possibly buffered within the processor 1705, and then executed.

When the systems and methods described herein are implemented in software 1712, as is shown in FIG. 15, the methods may be stored on any computer readable medium, such as storage 1720, for use by or in connection with any computer related system or method. The storage 1720 may comprise a disk storage such as HDD storage.

Clause 1. A computer-implemented method comprising:
receiving a dataset comprising records, wherein each record of the records comprises information descriptive of an event corresponding to an entity; clustering the records, resulting in clusters having categories respectively, each cluster category being indicative of an event category of the events, wherein each record of the records is associated with a cluster identifier indicating the cluster to which the record belongs;
determining one or more event attributes descriptive of the events; selecting from the dataset records having values of the determined event attributes;
grouping the selected records according to a grouping criterion, the grouping criterion being based on the values of the determined event attributes, the grouping resulting in groups, wherein each group comprises a set of records representing respective ones of the event categories;
determining at least one association rule using the groups and the cluster identifiers, wherein each association rule indicates a relationship between the event categories of a respective group.

Clause 2. The method of clause 1, the determining of the at least one association comprising:
identifying in the groups at least one pattern of a set of cluster identifiers, the pattern being defined by at least two groups of the groups, wherein each group defining the pattern comprises a set of records having said set of cluster identifiers, wherein the event categories between which the relationship is determined are categories of the clusters having said set of cluster identifiers respectively;
for each pattern of the at least one pattern creating the determined association rule between the event categories of the pattern.

Clause 3. The method of clause 1, wherein the relationship is a causality relationship indicating that one event category of the set of event categories is caused by the other event categories of the set of event categories, wherein a trained algorithm that is configured to receive event categories as input and to predict an event category of an event that is caused by other events having said input event categories is provided, wherein the determining of the association rule comprises for each group of the groups:
inputting event categories of the group into the trained algorithm and receiving a predicted event category;
determining the association rule as a causality relationship between the input event categories and the predicted event category in case:
the predicted event category is one of event categories of the group which are not input to the trained algorithm, and
a probability of the prediction is higher than a threshold value.

Clause 4. The method of clause 3, further comprising: receiving a training set of training association rules, wherein each training association rule of the training set is a causality relationship indicating that one training event category, named outcome event category, of a set of training event categories is caused by a subset of remaining training event categories, named subset of causing event categories, of the set of training event categories;
generating a set of rows for the training association rules respectively, wherein each row comprises at least one first column and a second column, and wherein the at least one first column of the row contains the subset of causing event categories, and wherein the second column of the rows contains the outcome event category;
training the algorithm using the set of rows with the first column as an independent variable and the second column as a dependent variable respectively.

Clause 5. The method of any of the preceding clauses 1 to 4, wherein the determined event attribute comprises a time of the event, wherein the group associated with the set of event categories of each of the association rules comprises a sequence of records which are sequential in time, wherein the last record of the sequence has an event category that is caused by the event categories of the other earlier records of the sequence according to the association rule.

Clause 6. The method of any of the preceding clauses 1 to 5, the relationship being a causality relationship indicating that one outcome event category of the set of event categories is caused by remaining subset of event categories of the set of event categories, the method further comprising:
monitoring the function of the entity, resulting in monitoring status records;
detecting a group of monitoring status records that have the subset of event categories respectively, the detected group fulfilling the grouping criterion;
controlling the entity to prevent the occurrence of the outcome event category.

Clause 7. The method of any of the preceding clauses 1 to 6, the event attribute comprising any one of: time of the event, location of the event, and frequency of occurrence of the event.

Clause 8. The method of any of the preceding clauses 1 to 7, the dataset comprising unstructured and/or structured data records.

Clause 9. The method of any of the preceding clauses 1 to 8, the dataset comprising unstructured records, the method further comprising:
tokenizing the unstructured records, resulting in tokens;
inputting the tokens of each record to a trained machine learning model for representing the record in a vector space, resulting in each record of the dataset having a vector representation in the vector space, wherein the clustering and the grouping is performed using the vector representations.

Clause 10. The method of clause 9, wherein the machine learning model is a neural network.

Clause 11. The method of any of the preceding clauses 1 to 10, the clustering being performed using an unsupervised clustering algorithm.

Clause 12. The method of any of the preceding clauses 1 to 11, wherein the determined event attribute is the time of the event, wherein the grouping criterion requires to group the records into time buckets of variable length of time, wherein the groups are the time buckets.

Clause 13. The method of any of the preceding clauses 2 to 12, wherein the groups are time buckets, wherein the pattern is identified by processing the time buckets via an overlapping or nonoverlapping moving window strategy.

Clause 14. The method of any of the preceding clauses 1 to 13, wherein the determined event attribute is the time of the event, the grouping comprising: generating a subset of the dataset by selecting a subset of the event categories associated to the records in the dataset; for each record in the subset generating a time bucket such that the end of the time bucket represents the timestamp of the each record; assigning each record in the dataset to the generated time buckets such that the timestamp of the record is within the respective time bucket.

Clause 15. The method of any of the preceding clauses 1 to 14, wherein the determined event attribute is the time of the event, wherein each group of the groups comprises a set of records which are sequential in time and represent a set of event categories respectively, wherein generating the at least one association rule comprises:
generating a list of association rules by generating at least one association rule for each group of the groups, wherein the association rule of a group is a causality relationship indicating that the last event category of the set of event categories of the group is caused by a subset of remaining causing event categories of the set of event categories;
selecting association rules from the list;
generating a set of rows for the selected association rules respectively, wherein each row comprises a first column and a second column, and wherein the first column of the row contains the subset of causing event categories of the corresponding association rule, and wherein the second column of the rows contains the last event category; training a machine learning model using the set of rows with the first column as an independent variable and the second column as a dependent variable respectively, the machine learning model is trained to predict an event category based on input event categories;
selecting association rules from the list of association rules;
for each selected association rule, splitting the associated sequence of records into multiple sub-sequences of records such that the last record of the sequence is also the last record in each of the sub-sequences;
adding a sub-sequence of records to a list of synthetic rules if the trained machine learning model predicts the last event category of the sub-sequence with a prediction probability exceeding a predefined threshold;
generating a set of rules by selecting synthetic rules and association rules from their respective lists.

Clause 16. The method of any of the preceding clauses 1 to 15, the entity being a production system, wherein the events comprise status reporting events and incident events, the status reporting event providing a status report of the function of the production system, the incident event causing an incident of the production system, wherein the set of event categories comprise one or more status reporting categories and one incident category, wherein the association rule is a causality relationship between the one or more status reporting categories and the incident category.

Clause 17. The method of any of the preceding clauses 1 to 15, the entity being an individual, wherein the dataset comprises Electronic Health Record (EHR) data, wherein the events comprise health status reporting events and a health incident event, wherein the set of event categories comprises one or more health status reporting categories and one health incident category, wherein the association rule is a causality relationship between the one or more health status reporting categories and the health incident category.

Clause 18. The method of any of the preceding clauses 1 to 15, the entity being a question answering system, wherein the dataset is a log of chat messages between the question answering system and a user, the records being the chat messages, wherein the events comprise negotiation messages and a decision event indicating a decision of the user, wherein the set of event categories comprises one or more negotiation message categories and one decision category, wherein the association rule is a causality relationship between the one or more negotiation message categories and the decision category.

Embodiments of the disclosure may be a system, a method, and/or a computer program product at any possible technical detail level of integration. The computer program product may include a computer readable storage medium (or media) having computer readable program instructions thereon for causing a processor to carry out aspects of the disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in the computing/processing device may receive computer readable program instructions from the network and may forward the computer readable program instructions for storage in a computer readable storage medium within the respective computing/processing device.

Computer readable program instructions for carrying out operations of some embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to customize the electronic circuitry, in order to perform aspects of some embodiments.

Aspects of the disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a computer, or other programmable data processing apparatus to produce a machine, such that the instructions, which may execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions, which execute on the computer, other programmable apparatus, or other device, may implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, blocks in the flowchart or block diagrams may represent a module, segment, or portion of instructions, which may comprise one or more executable instructions for implementing the specified logical function(s). In some implementations, the functions noted in the blocks may occur out of the order noted in the Figures. For example, two blocks shown in succession may, in fact, be accomplished as one operation, executed concurrently, substantially concurrently, in a partially or wholly temporally overlapping manner, or the blocks may sometimes be executed in the reverse order, depending upon the functionality involved. It will also be noted that the blocks of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The invention claimed is:

1. A computer-implemented method comprising:
receiving a dataset comprising records, wherein each record of the records comprises information descriptive of an event corresponding to an entity;
clustering the records into cluster categories, each cluster category being indicative of an event category of the events, wherein each record of the records is associated with a cluster identifier indicating a cluster to which the record belongs;
determining one or more event attributes descriptive of the events;
selecting, from the dataset, records having values of the determined event attributes;
grouping the selected records according to a grouping criterion into groups, the grouping criterion being based on the values of the determined event attributes, wherein each group comprises a set of records representing respective ones of the event categories; and
determining at least one association rule using the groups and the cluster identifiers, wherein each association rule indicates a relationship between the event categories of a respective group, wherein the relationship is a causal relationship indicating that one event category of the event categories is caused by the other event categories of the event categories, wherein a trained algorithm that is configured to receive event categories as input and to predict an event category of an event that is caused by other events having said input event categories is provided, wherein the determining of the association rule comprises, for each group of the groups:
  inputting event categories of the group into the trained algorithm and receiving a predicted event category;
  determining the association rule as a causal relationship between the input event categories and the predicted event category conditioned upon:
    the predicted event category is one of event categories of the group which are not input to the trained algorithm, and
    a probability of the prediction is higher than a threshold value.

2. The method of claim 1, wherein the determining of the at least one association comprises:
  identifying in the groups at least one pattern of a set of cluster identifiers, the at least one pattern being defined by at least two groups of the groups, wherein each group defining the at least one pattern comprises a set of records having said set of cluster identifiers, wherein the event categories between which the relationship is determined are categories of the clusters having said set of cluster identifiers respectively; and
  for each pattern of the at least one pattern, creating the determined association rule between the event categories of the pattern.

3. The method of claim 1, further comprising:
  receiving a training set of training association rules, wherein each training association rule of the training set is a causal relationship indicating that one training event category of a set of training event categories is caused by a subset of remaining training event categories of the set of training event categories;
  generating a set of rows for the training association rules respectively, wherein each row comprises at least one first column and a second column, and wherein the at least one first column of the row contains the subset of causing event categories, and wherein the second column of the rows contains the outcome event category;
  training the algorithm using the set of rows with the first column as an independent variable and the second column as a dependent variable respectively.

4. The method of claim 1, wherein the determined event attribute comprises a time of the event, wherein the group associated with the event categories of each of the association rules comprises a sequence of records which are sequential in time, wherein the last record of the sequence has an event category that is caused by the event categories of the other earlier records of the sequence according to the association rule.

5. The method of claim 1, wherein the relationship is a casual relationship indicating that one outcome event category of the set of event categories is caused by remaining subset of event categories of the set of event categories; and the method further comprising:
  monitoring the function of the entity to generate monitoring status records;
  detecting a group of monitoring status records that have the subset of event categories respectively, the detected group fulfilling the grouping criterion;
  controlling the entity to prevent the occurrence of the outcome event category.

6. The method of claim 1, wherein the event attribute comprising a datum chosen from the group consisting of: a time of the event, a location of the event, and a frequency of occurrence of the event.

7. The method of claim 1, wherein the dataset comprises data chosen from the group consisting of: unstructured data and structured data records.

8. The method of claim 1, wherein the dataset comprises unstructured records; and the method further comprises:
  tokenizing the unstructured records into tokens;
  inputting the tokens of each record to a trained machine learning model for representing the record in a vector space, each record of the dataset having a vector representation in the vector space, wherein the clustering and the grouping is performed using the vector representations.

9. The method of claim 8, wherein the machine learning model is a neural network.

10. The method of claim 1, wherein the clustering is performed using an unsupervised clustering algorithm.

11. The method of claim 1, wherein:
  the determined event attribute is the time of the event; and
  the grouping criterion groups the records into time buckets of variable length of time, wherein the groups are the time buckets.

12. The method of claim 2, wherein:
  the groups are time buckets; and
  the pattern is identified by processing the time buckets via an overlapping or nonoverlapping moving window strategy.

13. The method of claim 1, wherein the determined event attribute is the time of the event; and wherein the grouping comprises:
  generating a subset of the dataset by selecting a subset of the event categories associated to the records in the dataset;
  for each record in the subset, generating a time bucket such that the end of the time bucket represents the timestamp of the each record; and
  assigning each record in the dataset to the generated time buckets such that the timestamp of the record is within each respective time bucket.

14. The method of claim 1, wherein the determined event attribute is the time of the event, wherein each group of the groups comprises a set of records that are sequential in time and represent a set of event categories respectively, and wherein generating the at least one association rule comprises:
  generating a list of association rules by generating at least one association rule for each group of the groups, wherein the association rule of a group is a causal relationship indicating that the last event category of the set of event categories of the group is caused by a subset of remaining causing event categories of the set of event categories;
  selecting association rules from the list;
  generating a set of rows for the selected association rules respectively, wherein each row comprises a first column and a second column, and wherein the first column of the row contains the subset of causing event categories of the corresponding association rule, and wherein the second column of the rows contains the last event category;
  training a machine learning model using the set of rows with the first column as an independent variable and the second column as a dependent variable respectively, the machine learning model being trained to predict an event category based on input event categories;
  selecting association rules from the list of association rules;

27 for each selected association rule, splitting the associated sequence of records into multiple sub-sequences of records such that the last record of the sequence is also the last record in each of the sub-sequences;

adding a sub-sequence of records to a list of synthetic rules if the trained machine learning model predicts the last event category of the sub-sequence with a prediction probability exceeding a predefined threshold; and generating a set of rules by selecting synthetic rules and association rules from their respective lists.

15. The method of claim 1, wherein:

the entity is a production system;

the events comprise status reporting events and incident events, the status reporting event providing a status report of the function of the production system, the incident event causing an incident of the production system;

the set of event categories comprise one or more status reporting categories and one incident category; and the association rule is a causal relationship between the one or more status reporting categories and the incident category.

16. The method of claim 1, wherein:

the entity is a question answering system;

the dataset is a log of chat messages between the question answering system and a user;

the records are the chat messages;

the events comprise negotiation messages and a decision event indicating a decision of the user;

the set of event categories comprises one or more negotiation message categories and one decision category; and the association rule is a causal relationship between the one or more negotiation message categories and the decision category.

17. A computer-implemented method comprising:

receiving a dataset comprising records, wherein each record of the records comprises information descriptive of an event corresponding to an entity;

clustering the records into cluster categories, each cluster category being indicative of an event category of the events, wherein each record of the records is associated with a cluster identifier indicating a cluster to which the record belongs;

determining one or more event attributes descriptive of the events;

selecting, from the dataset, records having values of the determined event attributes;

grouping the selected records according to a grouping criterion into groups, the grouping criterion being based on the values of the determined event attributes, wherein each group comprises a set of records representing respective ones of the event categories; and

28 determining at least one association rule using the groups and the cluster identifiers, wherein each association rule indicates a relationship between the event categories of a respective group, wherein:

the entity is an individual;

the dataset comprises Electronic Health Record (EHR) data;

the events comprise health status reporting events and a health incident event;

the set of event categories comprises one or more health status reporting categories and one health incident category; and the association rule is a causal relationship between the one or more health status reporting categories and the health incident category.

18. A computer system comprising a one or more processors and a memory communicatively coupled to the one or more processors, wherein the memory comprises instructions which, when executed by the one or more processors, cause the one or more processors to perform a method comprising:

receiving a dataset comprising records, wherein each record of the records comprises information descriptive of an event corresponding to an entity;

clustering the records into cluster categories, each cluster category being indicative of an event category of the events, wherein each record of the records is associated with a cluster identifier indicating a cluster to which the record belongs;

determining one or more event attributes descriptive of the events;

selecting, from the dataset, records having values of the determined event attributes;

grouping the selected records according to a grouping criterion into groups, the grouping criterion being based on the values of the determined event attributes, wherein each group comprises a set of records representing respective ones of the event categories; and determining at least one association rule using the groups and the cluster identifiers, wherein each association rule indicates a relationship between the event categories of a respective group, wherein:

the entity is a production system;

the events comprise status reporting events and incident events, the status reporting event providing a status report of the function of the production system, the incident event causing an incident of the production system;

the set of event categories comprise one or more status reporting categories and one incident category; and the association rule is a causal relationship between the one or more status reporting categories and the incident category.

* * * * *